US009531607B1

(12) United States Patent
Pai et al.

(10) Patent No.: US 9,531,607 B1
(45) Date of Patent: Dec. 27, 2016

(54) RESOURCE MANAGER

(75) Inventors: Derek S. Pai, Seattle, WA (US); Michael R. Foster, Issaquah, WA (US); David John Ward, Jr., Seattle, WA (US); Christopher B. Barclay, Seattle, WA (US); Gautam S. Shanbhag, Issaquah, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 1162 days.

(21) Appl. No.: 13/528,677

(22) Filed: Jun. 20, 2012

(51) Int. Cl.
*H04L 12/16* (2006.01)
*H04L 12/26* (2006.01)

(52) U.S. Cl.
CPC .................................... *H04L 43/08* (2013.01)

(58) Field of Classification Search
CPC ............................ H04L 43/08; G06Q 10/0639
USPC ................................................. 709/206, 223
See application file for complete search history.

(56) References Cited

U.S. PATENT DOCUMENTS 6,985,937 B1 1/2006 Keshav et al.
7,099,943 B1 8/2006 Tondering
7,206,845 B2 4/2007 Banning et al.
7,320,131 B1 * 1/2008 O'Toole, Jr. ............ G06F 9/505 705/52
7,634,423 B2 12/2009 Brocklebank
7,720,968 B2 5/2010 Clarke, Jr. et al.
7,844,441 B2 11/2010 Grabarnik et al.
8,261,268 B1 9/2012 Forgette
8,316,101 B2 * 11/2012 Ammerlaan ............ G06F 9/505 705/39
8,321,704 B2 11/2012 Clarke et al.
8,359,223 B2 1/2013 Chi et al.
9,037,703 B1 * 5/2015 Wu ...................... G06F 9/5027 370/252
2006/0083170 A1 * 4/2006 Silva .................... H04W 16/18 370/238
2006/0112075 A1 5/2006 Hellerstein et al.
2006/0190482 A1 * 8/2006 Kishan .................... G06F 9/485
2007/0226348 A1 9/2007 Grabarnik et al.
2008/0072231 A1 * 3/2008 Yoshida .................... G06F 9/50 718/104
2008/0313716 A1 12/2008 Park (Continued)

OTHER PUBLICATIONS

Office Action dated Dec. 13, 2013, U.S. Appl. No. 13/528,701, filed Jun. 20, 2012.

(Continued)

*Primary Examiner* — Brian J Gillis
*Assistant Examiner* — Steve Lin
(74) *Attorney, Agent, or Firm* — Knobbe, Martens, Olson & Bear, LLP

(57) ABSTRACT

A resource manager may monitor resources offered by a resource provider. The resource manager receives computing metrics from the resources and may perform a management action when a customer defined usage limit is satisfied. The management action may include the resource manager generating an alert, or the resource manager preventing the customer from further accessing the resources offered by the resource provider. The resource manager may also be used to reduce the cost of running a customer's application that uses resources offered by the service provider. The resource manager may also receive business metrics from the customer and determine rates of return using the business metrics and the computing metrics.

27 Claims, 15 Drawing Sheets

(56) References Cited

U.S. PATENT DOCUMENTS

2009/0016220 A1* 1/2009 Uysal .................. H04L 41/5003 370/232
2009/0171776 A1 7/2009 Scipioni
2010/0281482 A1* 11/2010 Pike .................... G06F 9/44505 718/102
2010/0332373 A1 12/2010 Crabtree et al.
2011/0022586 A1* 1/2011 Wilkinson ........ G06F 17/30306 707/720
2011/0161973 A1 6/2011 Klots et al.
2012/0166625 A1 6/2012 Suit
2012/0167083 A1 6/2012 Suit
2012/0233328 A1 9/2012 Iyoob
2012/0246646 A1 9/2012 Bakman
2013/0091391 A1* 4/2013 Arndt .................. G06F 11/0754 714/47.1
2013/0106906 A1 5/2013 Roche et al.
2013/0111476 A1 5/2013 Medovich
2013/0166724 A1 6/2013 Bairavasundaram et al.

OTHER PUBLICATIONS

Office Action dated Dec. 19, 2013, U.S. Appl. No. 13/528,752, filed Jun. 20, 2012.

* cited by examiner

1. Customer registers and defines instances and resource groups
2. Customer requests resource monitoring
3. Resource Manager receives usage data for Customer's instances and resource groups
4. Resource Manager analyzes usage data
5. Resource Manager notifies Customer 1. Customer registers and defines instances and resource groups
2. Customer requests resource monitoring
3. Resource Manager receives usage data for Customer's instances and resource groups
4. Resource Manager analyzes usage data
5. Resource Manager notifies resource provider User has exceeded usage limit
6. Resource Provider prevents User access 1. Customers register and define instances and resource groups
2. Resource Manager receives usage data for Customers including application configuration information
3. Resource Manager analyzes usage data
4. Resource Manager notifies one Customer of available enhancement 1. Customer provides test task
2. Resource Provider process test task
3. Resource Manager receives usage data
4. Resource Manager analyzes usage data
5. Resource Manager adds enhancement to Customer's resource group 1. Customer provides test task(s) and potential enhancement
2. Resource Provider process test task(s)
3. Resource Manager receives usage data
4. Resource Manager analyzes usage data
5. Resource Manager adds enhancement to Customer's resource group and/or notifies customer that enhancement was effective 1. Customer registers and defines instances and resource groups
2. Resource Manager receives usage data for Customer's resource groups
3. Resource Manager receives business metrics
4. Resource Manager determines rate of return
5. Resource Manager reports rate or return to Customer

*1. Customer registers and defines instances and resource groups*
*2. Resource Manager receives usage data for Customer's resource groups*
*3. Resource Manager receives business metrics*
*4. Resource Manager determines rate of return*
*5. Resource Manager commands Resource Provider to direct resources to resource groups with best rate of return*

RESOURCE MANAGER

BACKGROUND

Organizations may operate computer networks that interconnect numerous computing systems to support the operations of the organizations. The computing systems may be co-located, or part of a local network, or the computing systems may be distributed across multiple distinct geographical locations and include one or more private or public networks. For example, some organizations make use of data centers that may house large amounts of data for the organization. The data centers may be part of an organization's local network, or the organization may utilize a data center that in a separate geographical location. Further, the data center itself may be implemented as a co-located computing system or it may be a distributed across one or more private or public networks.

Organizations may also utilize virtualization technologies for creating dynamically scalable computing systems. Through the use of virtualization technologies, organizations need not purchase dedicated hardware for processing. Rather, the organization may purchase computing resources on an as needed basis from a computing resource service provider. For example, virtualization technologies may allow a single physical computing machine to be shared among multiple users by providing each user with one or more virtual machines hosted by a single physical computing machine. Each virtual machine may be a software simulation acting as a distinct logical computing system that provides users with the illusion that they are the sole operators and administrators of a given hardware computing resource. In addition, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store that provides users with the illusion that they are the sole operators and administrators of the data storage resource.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Overview

Figure 1:
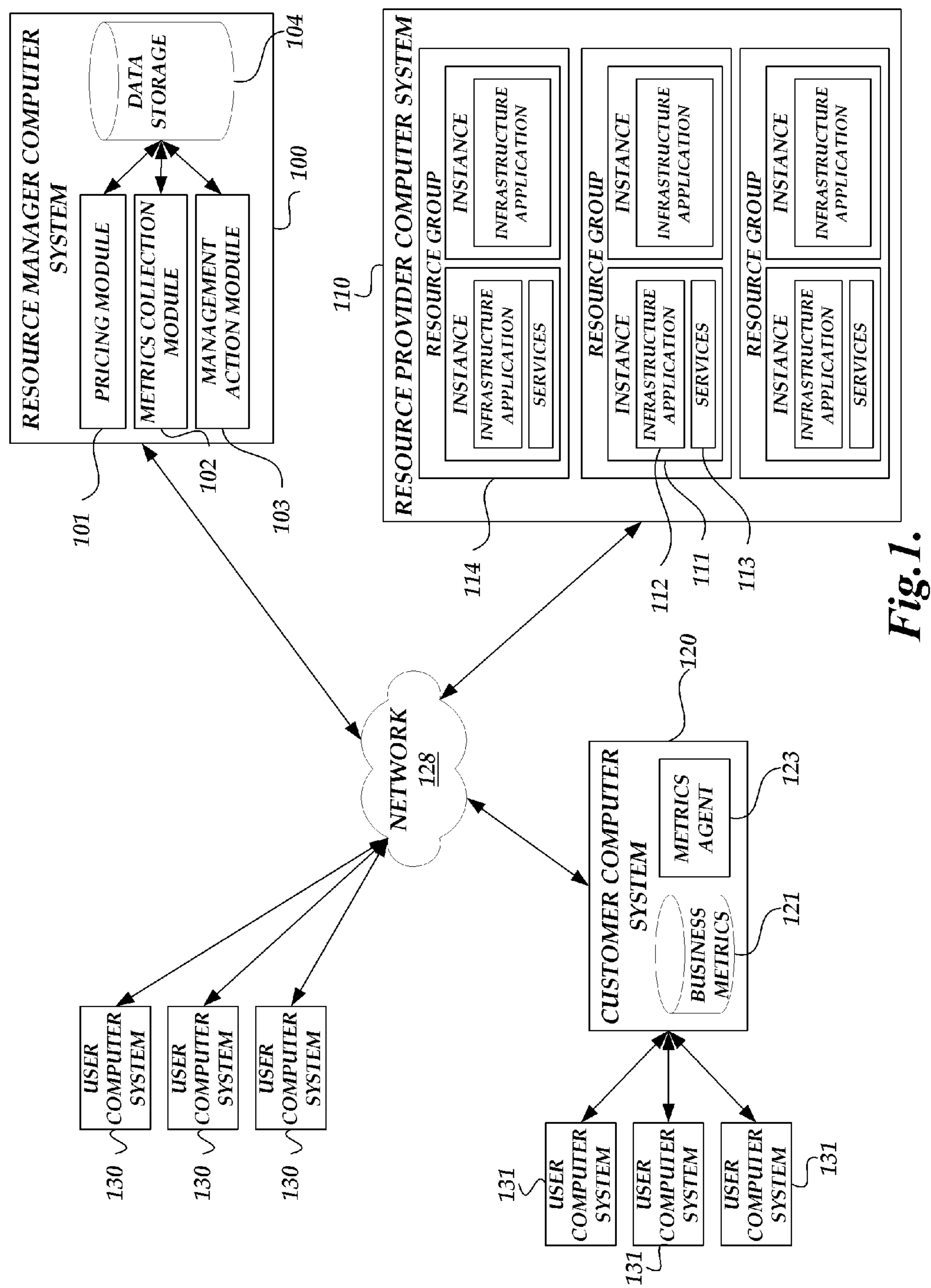
FIG. 1 illustrates a block diagram of a resource manager computer system in communication with a resource provider system and customer computing systems according to one embodiment.

In many environments utilizing virtualization technologies, resource provider networks that offer different types of virtualized computing, storage, and/or other network-accessible functionality to customers allow the customers to access various services for a fee. For example, a resource provider may offer a storage service, a database service, a load balancing service, a DNS service, and/or compute service that enables customers to reserve or purchase access to computing resources using different resource allocation models and using different pricing policies. In a specific example, a customer may reserve access to computing resources in the form of one or more instances for a relatively long duration, such as one year or three years, or a customer may purchase access to computing resources on an as-needed basis. For example, a customer selling goods using virtual computing resources may require more computing resources during a busy holiday season and may require fewer resources during non-holiday seasons. By purchasing computing resources on an as-needed basis, the customer only pays for the computing resources it needs at a given time.

For some types of resource reservations, at least a portion of the price paid by the customer may fluctuate over time in response to the changing supply and demand of the resources within the provider network. The provider network operator may need to ensure that a number of potentially competing demands are met, e.g., that all guaranteed commitments to clients (such as long-term reservations for which payment has already been made) are honored, that the dynamically-varying component of resource pricing does not get so high that customer satisfaction suffers, that the provider's data center investment is justified by a reasonable level of resource utilization and revenue, and so on. In business environments where clients may choose from among multiple providers for network-based computing options, provider network operators may wish to maintain high levels of customer satisfaction and customer retention, e.g., by making resource acquisition easy and economical, and by reducing the complexity of client resource budget management as much as possible.

Resource providers may provide resource instances for customers. Resource instances may be one or more virtual machines that a customer may use to perform computing tasks or execute business applications. A resource instance may conceptually represent a single hardware computing device, but may be implemented as software executing on a portion of a single hardware computing device or as software executing across several hardware computing devices. Thus, to the customer, a resource instance may be viewed as one, dedicated, computing device, although in implementation, the customer may be sharing a hardware computing device with other customers (each customer with their own resource instance). Alternatively, a resource instance may be viewed by a customer as a single, dedicated, computing device although it may be implemented across several hardware computing devices. By offering customers virtual-machine resource instances, resource providers can maximize their hardware computing devices to satisfy a large number of customers in a more efficient manner than if each customer was operating its own hardware computing device.

Resource providers may also provide infrastructure applications or computing services to customers. The infrastructure applications may be executed by the resource instances to provide customers a platform for their business applications. Infrastructure applications may be applications, libraries, development tools, etc. that allow a customer to implement their business application. For example, a customer may have a business application consisting of an e-commerce store front. The customer may purchase one or more infrastructure applications, such as pre-configured web-servers, database servers, and/or third-party user interface libraries from the resource provider to execute with its resource instances. Resource providers may also provide services to customers in addition to, or in lieu of, infrastructure applications. For example, a resource provider may offer a payment processing service or database service to the e-commerce store front customer.

Described herein are various embodiments for managing resources in an environment using virtualization technologies. Resource providers, for example a company or a public sector organization, may set up networks to provide one or more virtualization services accessible via a network to a distributed set of customers. A resource provider network may include one or more data centers hosting various resource pools, such as collections of physical servers used to host instances on behalf of customers, storage devices, database services, networking equipment and the like, needed to implement and distribute the infrastructure applications and services offered by the resource provider. The computing resources may in some embodiments be offered to clients in units called "instances," such as virtual machines or instances that run directly on the physical hardware of a server. An instance may be implemented, for example, by one or more servers with a specified computational capacity (for example, processing speed, number of CPUs, memory size, storage size, bandwidth etc.). An instance may also include an operating system and one or more applications. For example, the instance may execute an operating system that itself executes various software applications such as database components, data processing components or web server components.

In some embodiments a customer or user may be provided direct access to a resource instance, e.g., by giving a user an administrator login and password. In other embodiments the resource provider may allow clients to specify execution requirements for specified client applications, and schedule execution of the applications on behalf of the client on execution platforms (such as application server instances, Java™ virtual machines (JVMs), general purpose or special-purpose operating systems, or high-performance computing platforms) suitable for the applications, without for example requiring the client to access an instance or an execution platform directly. A given execution platform may utilize one or more resource instances in some implementations; in other implementations multiple execution platforms may be mapped to a single resource instance.

Resource providers may, in some cases, utilize a flexible set of resource reservation, control and access interfaces for their customers For example, a resource provider may implement a programmatic resource reservation interface (e.g., via a web site or a set of web pages) that allows customers to learn about, select, purchase access to, and/or reserve resource instances. Such an interface may include capabilities to allow browsing of a resource catalog, provide details and specifications of the different types or sizes of resources supported, the different reservation types or modes supported, pricing models, and so on. The provider network may support several different purchasing modes or reservation modes. For example, the resource provider may support purchasing resources for reserved long term use (a "reserved instance"), on-demand use (an "on-demand instance"), or bid-price-based use (a "bid-priced instance" or "spot instance"). When a customer purchases a reserved instance, the customer may make a low, one-time, upfront payment for a resource instance, reserve it for a specified duration such as a one or three year term, and pay a low hourly rate for the instance; the client would be assured of having the reserved instance available for the term of the reservation. When a customer purchases an on-demand instance, a customer client could pay for capacity by the hour (or some appropriate time unit), without any long-term commitments or upfront payments. When a customer purchases a bid-priced instance, the customer may define rules for purchasing instances that may trigger whether the customer purchases instances. For example, the customer could specify the maximum price per unit of time that it is willing to pay for a particular type of resource, and if the client's maximum price exceeds a dynamic bid price, that type of resource would be provided to the customer In some embodiments, bid-priced instance pricing may fluctuate based on the current supply and demand of resource instances.

In some embodiments, dynamically resizable pools of resource instances may be set aside for the different reservation types or modes—e.g., long-term reserved instances may be allocated from one pool, on-demand instances from another, and so on. During periods when the supply of the requested resource type exceeds the demand, the price may become significantly lower than the price for on-demand mode. In some implementations, if the price increases beyond the maximum bid specified by a customer, a resource allocation may be interrupted—i.e., a resource instance that was previously allocated to the customer may be reclaimed by the resource manager and may be allocated to some other customer that is willing to pay a higher price. Other purchasing modes or combinations of modes may be implemented by the resource provider in some embodiments.

Resource providers may also provide identity and access management tools for customers to set create one or more user accounts so that more than one developer or entity may access the resources that customers purchase from the resource providers. For example, an on-line retail catalog (the customer) may purchase virtual computing resources from resource providers. The on-line retail catalog may have several content developers (e.g., web page developers, database administrators, plug-in application developers) that require access to the computing resources of the customer. Through the use of the identity and access management tools, the on-line retrial catalog may create a user account or profile for each developer that requires access to the resources, and create individual security credentials for each user so that the developers only have access to the computing resources each user needs according to the scope of their development role. In some embodiments, the resource provider may allow customers to define access for users at different levels of granularity. For example, a customer may grant access to a user at the resource instance level, the virtual machine level, the application level or the application programming interface (API) level. In some embodiments, the identity and access management tools may allow customers to define roles that may represent one or more users sharing similar attributes or define users with respect to a resource or system as opposed to human computer operator.

Customers may wish to monitor the cost and allocation of resources in a virtual computing environment. This may prove difficult, however, as customers may have several instances and may be using different infrastructure applications and services with each instance. In addition, customers may be interested in alternative instances, infrastructure applications or services that may provide a cost benefit or a faster processing benefit. For example, a customer may be interested that other customers using the same database application also use a particular enhancement service to improve queue latency. In addition, when customers create users and define security credentials for those users, they are typically not linked to the user's usage of the computing resources as resource providers may not track computing resource usage data at the user level. Thus, a customer is unable to restrict the access of a user for abusing computing resources.

As described herein, to monitor the cost and allocation of resources, customers may advantageously create resource groups. A resource group may be a combination of resource instances, infrastructure applications and/or services that the customer uses to perform a task or execute a business application. Customer may create resource groups by associating a tag or usage identifier with resource instances, infrastructure applications storage services, or some other computing resources to logically groups the computing resources together in one "bucket." As a customer instantiates resource instances with the resource provider, requests storage from the resource provider, launches infrastructure applications within instances or utilizes services of the resource provider, the customer may provide a tag or usage identifier to the resource provider. The resource provider may then form a resource group for monitoring cost and usage of the tagged computing resources.

Customers may form resource groups for various reasons. For example, customers may form a resource group for each of their business applications. Customers may also form resource groups to track cost and/or usage over a period of time. In some cases, customers may want to compare business application implementations to determine which implementation provides the best results. Through the use of resource groups, customers may logically group any combination of computing resource for monitor and control. Further, when customers make spending decisions for computing resources, they generally track their costs historically, but it is difficult to correlate the costs for the computing resources to their benefit. Resource groups provide a mechanism to facilitate the correlation of costs to their benefits. For example, a customer using a virtual computing environment to run a distributed gaming application may be interested in linking the number of instances running the gaming application to the amount of playing time, number of users or revenue generated by players playing the game. The customer may be interested in determining the return on investment or rate of return for adding additional instances, instances running different infrastructure applications (e.g., running different databases applications, etc.), different types of instances (e.g., instances having differing amounts of RAM, processors, network bandwidth, storage, etc.) using additional services offered by the resource provider. Currently, customers are not able to automatically link their business metrics (e.g., metrics used to measure business performance) with usage metrics (e.g., amount of CPU time used, storage used, bandwidth used, requests issued, etc.) or the cost of using such resources. Since different computing resource instances use different pricing policies, the problem is further compounded. For example, the customer executing the gaming application may be interested in determining the rate of return for executing a reserved instance versus the rate of return for executing an on-demand or bid-priced instance. Resource groups may provide an advantageous mechanism for determining a rate of return with a particular resource instance type (e.g., on-demand or bid-priced).

Accordingly, the present disclosure describes embodiments of computer systems that allow customers to monitor, optimize, and realize maximum value of resources that are offered by resource providers of virtual computing environments. In some embodiments, a resource provider may work in conjunction with a resource manager. A resource manager may be one or more computer systems that assist customers in the management of the computer resources resource provider allocates to the customers.

According to some embodiments, a computer system acting as a resource manager receives a request from a customer to monitor the computing resources of the customer. The request may include a resource usage limit and a usage identifier that identifies a plurality of resources of the customer. The system may access resource usage data that indicates an amount of resources associated with the usage identifier that have been used. When the amount of resources satisfies the resource usage limit, the computer system performs a management action. In some embodiments, the management action may be generating an alert, while in some embodiments, the management action may prevent access to the plurality of computer resources of the customer. The usage identifier may include an identification of a user that has been granted permission to utilize the plurality of computing resources of the customer.

According to some embodiments, a computer system acting as a resource manager may determine first computing metrics for a first resource group that are used to, for example, run a web-based application. The first resource group may include one or more instances running one or more infrastructure applications as well as other services offered by a resource provider (e.g., database services, storage services, load balancing services, etc.). The computer system may also determine second computing metrics for a second resource group that includes resources that differ from the resources included in the first resource group. The computer system may compare the first computing metrics and the second computing metrics to determine if the second computing metrics indicate that the second resource provides a greater benefit for running the web-based application than the first resource group. The computer system may then provide a notification to the customer comprising the differences and/or an indication of the greater benefit. The greater benefit may be faster processing or lower cost, for example. In some embodiments, the computer system may provide the notification in a user interface, make it available via an Application Program Interface ("API") call, or send the notification via email to the customer.

In some other embodiments, a computer system acting as a resource manager may determine baseline metrics for a baseline resource group used to run a business application such as a web-based application, for example. The resources may include one or more one or more instances, one or more infrastructure applications running on the instances, and one or more services (e.g., a storage service, a database service, a load balancing service, etc.) offered by one or more service providers. The computer system may also determine modified metrics for running the web-based application using a modified resource group. For example, the modified resource group could include at least a portion of the resources from the baseline resource group with one or more enhancement elements added to it. When the computer system determines that the modified metrics indicate that the modified resource group provides a benefit for running the web-based application over the baseline resource group, it may generate a notification. The notification may include an identification of the one or more enhancement elements. The system may communicate the notification to a customer that is executing the web-based application similar to the baseline resource group. In a specific example, suppose the baseline resource group uses a virtual machine running an operating system and a database management program to effectuate a digital photograph sharing application. In this example, the modified resource group could replace the virtual machine running the database management program with a database service offered by the resource provider. Metrics can be gathered for both the virtual machine running the database management program and the database service. In the situations where the modified resource group saves the customer money a recommendation could be sent to the customer providing notice that a change from using the virtual machine running the database management program with the database service could result in potential savings to the customer.

In some embodiments, the system may log transactions and use the log to replay the transactions against the customer's business application as it uses the baseline resource group or the modified resource group. The metrics may then be communicated to the customer. In some embodiments, the one or more enhancement elements may be automatically added to the resource group used by the business application when the system determines that the one or more enhancement elements provide a benefit to the customer.

According to one embodiment, a computing system acting as a resource manager may access business metrics of a customer that are associated with a task that uses a group of resources. The resource manager may determine computing metrics for the task and determine a rate of return based at least in part on the computing metrics and the business metrics. The resource manager may generate and communicate the rate of return in a report. Alternatively, the customer may determine the rate of return using his or her local resources. For example, the resource manager may make the computing metrics available to the customer, e.g., via an API, and the customer may download them. The customer may locally determine a rate of return based at least in part on the computing metrics and the business metrics.

In some embodiments, a computing system acting as a resource manager may access or receive business metrics associated with a business application. The resource manager may determine first computing metrics for a first resource group executing tasks of the business application and may determine a first rate of return based at least in part on the first computing metrics and the business metrics. The resource manager may also determine second computing metrics for a second resource group and may determine a second rate of return based at least in part on the second computing metrics and the business metrics. When the resource manager determines that the second rate of return is greater than the first rate of return, it may automatically direct future tasks of the business application to the second resource group. The resource manager may also, in some embodiments, generate and communicate a report to a customer computing system describing the first and second rate of return.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described. Further, although various aspects of the disclosure will be described with regard to illustrative examples and embodiments, it can be appreciated that the disclosed embodiments and examples should not be construed as limiting. For example, although the present application will be discussed with respect to certain computing devices, it can be appreciated that the systems, methods, and process described for managing resources may be applied to any computing device that may share resources within a network.

Example of Resource Management Environment

FIG. 1 illustrates a block diagram of a resource manager computer system 100 ("resource manager") in communication with a resource provider computer system 110 ("resource provider"), customer computing systems 120 ("customer" or "customers"), and user computer systems ("users") 130 according to one embodiment. The resource manager 100 may be a computer system, such as a server computer, that communicates with customers 120 to provide management functions of computing resources. In an embodiment, the resource manager 100 may also be a group of computer systems that operate together to effectuate a resource manager service. As such, some of the functions described with respect to the resource manager 100 may be distributed across multiple computer systems. The resource manager 100 may also communicate with the resource provider 110 to obtain computing metrics for the customers 120 computing resources. In some embodiments, the resource manager 100, the resource provider 110, user computer systems 130 and/or the customer computing systems 120 are executed or embodied by one or more physical or virtual computing systems. Similar to the resource manager computer system 100, resource provider computer system 110 can be a group of computer systems that operate together to effectuate a resource provider service by providing resources such as one more resource instances 111 running one or more infrastructure applications 112 and/or utilizing one or more services 113. The resource provider 110 may associate resources of the customer into a resource group 114. The computer systems used to effectuate resource manager computer system 100 and resource provider computer system 110 can include a CPU, I/O devices, storage, and memory. The I/O devices can include a display, a network connection to the network 128, a computer-readable media drive, and other I/O devices (e.g., a keyboard, a mouse, speakers, etc.). An embodiment of the resource manager 100, and/or resource provider 110 can be stored as one or more executable program modules in the memory of a server, and can interact with each other and the customer computing systems 120 over the network 128. The network 128 can, for example, be a publicly accessible network of linked networks, such as the Internet, possibly operated by various distinct parties. In other embodiments, the network 128 can be a private network, such as, for example, a corporate or university network that is wholly or partially inaccessible to non-privileged users. In still other embodiments, the network 128 can include one or more private networks with access to and/or from the Internet. Moreover, the network 128 may be any wired network, wireless network, or combination thereof. In addition, the network 128 may be a personal area network, local area network, wide area network, cable network, satellite network, cellular telephone network, etc., or any combination thereof. Protocols and components for communicating via the Internet or any of the other aforementioned types of communication networks are well known to those skilled in the art of computer communications and, thus, need not be described in more detail herein. Although in the embodiment of FIG. 1, the resource manager 100 and the resource provider 110 are shown as separate computing systems in communication over the network, in other embodiments, the resource manager 100 and the resource provider 110 may be the same computing system or distributed computing systems. In addition, while in FIG. 1 customer computer system 120 is shown as a separate computing system in communication with the network 128, in other embodiments, the functions and the operations of the customer computer system 120 may be performed virtually by one or more instances of the resource provider 110. As used herein, the terms "customer" or "customer computer system" is understood to mean either a separate customer computer system 120 in communication via network 128 or a virtual customer computer system executing similar functionality using one or more instances.

In some embodiments, the resource manager 100 may implement one or more modules for managing computing resources of one or more customers. For example, as shown in the illustrative embodiment of FIG. 1, the resource manager 100 may implement a pricing module 101, a metrics collection module 102 and a management action module 103. The modules of the resource manager 100 may be in communication with a data store 104. In some embodiments, the data store 104 may be part of, or co-located with, the resource manager 100 as shown in FIG. 1. In other embodiments, the data storage 104 may be remotely accessed by the resource manager 100 and/or may be implemented as a web service.

The pricing module 101, in some embodiments, may include software code that, when executed, calculates the price charged to the customer for the customer's use of computing resources made available by the resource provider 110. For example, the pricing module 101 may determine the price to charge a customer for the reserved instances, on-demand instances, infrastructure applications, and/or services the customer used during the last month. In some embodiments, the pricing module 101 may access pricing policies for the computing resources from the data storage 104. For example, pricing for reserved instances or on-demand instances may be fixed and stored in the data storage 104. When a customer uses a reserved or on-demand instance, the pricing module 101 may access the associated pricing policy to determine the pricing for the customer. In some embodiments, the pricing module 101 includes software code that calculates the pricing for bid-priced instances based on the availability of resources. Since bid-priced instance pricing fluctuates depending on the supply and demand of computer resources, the pricing module 101 may calculate the price of bid-priced instances according the availability of computing resources. In some embodiments, the pricing module 101 may store a customer's pricing data in the data store 104 for historical purposes. For example, the pricing module 101 may store the amount a customer was charged for computer resources during a given time frame so that other modules of the resource manager (e.g., the metrics collection module or the management action module) may access it.

The resource manager 100 may also implement a metrics collection module 102. The metrics collection module 102 may include software code that when executes collects computing metrics from the resource provider 110, or the business metrics from customer computer systems 120. The metrics collection module 102 may interface with the resource provider 110 to collect raw usage data. For example, the metrics collection module 102 may collect the number of instances used by a customer, the types of instances used by the customer, meta-data indicating the types of infrastructure applications used in the resource groups of the customer (e.g., operating systems, database servers, web servers, application servers, processing modules), gigabytes (GBs) of storage used by a customer, number of input/output operations used, bandwidth, or any other value that may prove advantageous to collect for virtual computing environment billing or performance. In some embodiments, the computing metrics collected by the metrics collection module 102 may be stored in data storage 104 so that they may be available to the pricing module 101 and the management action module 103.

Customers 120 may, in some embodiments, opt-in or opt-out of having their computing metrics collected by the metric collection module 102. For example, some customers may use the resource provider 110 to purchase computing resources, but may not request monitoring of those resources by the resource manager 100. Further, these customers not want to share their computing metrics with other customers, even if the metrics are used anonymously. Thus, in some embodiments, the resource manager 100 or the resource provider 110 may provide a mechanism for customers to opt-out of or opt-in to having computing metrics collected. The mechanism may be, for example, a user interface that is part of the customer account creation process that allows the customer to select or de-select a checkbox indicating that collection of computing metrics is permitted. In some embodiments, the resource manager 100 may require customers requesting monitoring to consent to have their anonymous computing metrics used to suggest enhancements to other customers.

Computing metrics may be collected at several different levels of granularity. For example, computing metrics may be collected at a resource provider level to determine the number of instances that are used across all customers, and the types of those instances. Resource provider level metrics may be used by the pricing module 101 to determine pricing for bid priced instances, for example. The computing metrics may also be collected at a customer level. For example, the computing metrics may quantify the number and type of instances used by a customer, or the number of GBs of storage a customer is using. In some embodiments, computing metrics may also be collected at a user level. Customers may be able to create user, or sub-customer, accounts associated with their customer accounts and grant different security credentials to the created user accounts to access the computer resources of the customer. The user accounts may correspond to an individual, human user of a computer, a role that may be filled by one or more individual, human computer users of a computer, or a computing system or group of computing systems. The created user accounts may be associated with user computer systems 131 that access the resource provider through a connection to the customer computer system 120, or the created user accounts may be associated with user computer systems that access the resources of the customer directly via the network 128. In other embodiments, user computer systems 130, 131 may access the resource provider 110 through the customer computer system and the network. As users utilize different instances, applications, and services, the metrics collection module 102 may collect data indicating the amount of resources a user account of a customer has used. User level data may be used by the management action module 103 to generate alerts or restrict the user's access to computing resources as described below with respect to FIGS. 2B and 5B.

In some embodiments, the metrics collection module 102 collects business metrics from customer computer systems 120. The business metrics may quantify the performance of a customer's advertising campaign, service, or product. For example, business metrics may indicate the amount of revenue generated through the customer's use of a resource group or the business metrics may reflect the number of sales for a particular product that was generated through the use of the resource provider 110. In other embodiments, business metrics may reflect the output of a business application or task. For example, a research institution may use the resource provider 110 to process large sets of research data to determine several quantifiable result values. The number of result values determined may represent a business metric that is important to the research institution in determining the effectiveness of using the resource provider. Business metrics may also, in some embodiments, represent feedback from the consumers of the customer's goods or services. For example, business metrics may reflect customer survey data or may reflect approval numbers associated with the customer's goods or services. It should be understood that business metrics could be any metric that has value to the customer and can be used to evaluate the performance, quality, or satisfaction associated with the customer's goods or services.

In some embodiments, the business metrics may be received from customers via a user interface or ftp "put" operation. For example, when a customer makes use of the computing resources offered by the resource provider, the customer may associate a usage identifier or "tag" through the API used to access resources and create a resource group. As the customer uses the resource group, the customer may collect business performance metrics, such as revenue generated. The customer may then use the user interface provided by the metrics collection module to provide the performance metrics and link it with the tag used by the resource group. For example, a customer may use the resource provider computer system to execute a mass marketing campaign for selling automobiles. When the customer creates the marketing campaign, the customer provides "Auto 1" as a usage identifier when instantiating one or more computing resources with the resource provider, thereby creating a resource group. As the customer sells automobiles, the customer may access a user interface that allows the customer to input each recorded sale and associated it with the "Auto 1" resource group tag. As a result, the metrics collection module may link the business metric (auto sales) with the resources that resulted in the sale (the "Auto 1" resource group). In other embodiments, the metrics collection module may receive the business metrics through a "put" operation, as opposed to through a user interface.

In some embodiments, the resource provider 110 may provide an API for customers to use to record business metrics programmatically as the resource group is used. For example, if the customer creates software code that is to be executed by resource instances provided by the resource provider 120, the customer may add a function or method call to an API that invokes the metrics collection module 102. For example, suppose an accounting firm uses resource instances to process payroll. At the end of the processing required to issue a paycheck to an employee, the code may make a call to the API of the metrics collection module to increment a business metric by one. The call may be, for example, "incrementMetric(1, 'PAYCHECK')", where the function "incrementMetric" may accept as arguments (1) the amount to increase the metric by, and (2) a metric identifier. Additional functions may be used to manage the collection of business metrics through an API. For example, the API may provide functions for initializing, incrementing, decrementing, resetting, archiving, or deleting metrics. One skilled in the art will recognize there are many functions that could support metric collection through the use of an API.

In other embodiments, a metrics agent 123, may be installed on customer computer systems 123 to collect business metrics from customer side application. In embodiments where the operations and functions of the customer computer system are executed virtually through the use of instances the metrics agent may be deployed or installed within the customer's virtual computing environment. In addition, services running in the customer's instances may also collect metrics and act as a metrics agent. A metrics agent may also be a service the resource provider 110 makes available to customers. The metrics agents may be in communication with a business metrics data store 121 where customers may store business metrics at the customer computer system 120. The business metrics data store 121 may be part of, or co-located with, the customer computer system 120 as shown in FIG. 1. In other embodiments, the business metrics data store 121 may be remotely accessed by the customer computer system 120 and/or may be implemented as a web service or service within the customer's instance. Metrics agents 123 may prove advantageous in situations where a customer uses a legacy, customer-side application for collecting business metrics, but uses a resource provider to execute some or all of a marketing campaign. In such instances, the metrics agent 123 may automatically and/or periodically transfer business metrics from the business metrics data store 121 of the customer computer system 120 to the metrics collection module 102. In some embodiments, the metric agent 123 may be time synched with the metrics collection module 102 so that business metrics may be linked to the computing metrics collected by the metrics collection module 102. In some embodiments, the metrics agent 123 may transfer the business metrics using a tag that associates the business metrics with resource groups used by the customer computer system 120.

The resource manager 100 may implement a management action module 103. The management action module 103 may analyze and interpret computing or usage metrics and business metrics and perform a management action. Management actions may include, for example, generating an alert, sending a command to the resource provider to restrict access to computing resources or sending a command to the resource provider to load balance processing toward those resource groups that provide a greater benefit for cost or processing or a greater rate of return. Management actions may also include turning off instances, de-allocating or de-provisioning instances, or temporarily suspending instances.

In some embodiments, the management action module 103 may generate a user interface that allows a customer to create and define a management action. In some embodiments, a customer may be able to define an alert when the total cost of all of the customer's resources satisfied a resource usage limit value. For example, a customer may only have $5,000 a billing cycle to spend on computing resources available from the resource provider. The customer may access a usage alert definition user interface generated by the management action module 103 to define the alert. The customer may request that an email be sent to the customer computer system when the sum of all resource instance charges reaches $4,500. During the billing cycle, the metrics collection module 102 collects usage data of the customer from the resource provider, and the pricing module 101 determines the cost for the computing resources reflected in the usage data. The management action module 103 may periodically calculate a billing cycle total charge and compare it to the resource usage limit value ($4,500). If the billing cycle total charge satisfies (i.e., is greater than or equal to) the resource usage limit value, the management action module will generate an email and send it to customer computer system.

The management action module 103 may also command the resource provider computer system to prevent access to additional resources, or terminate processing of resources. In some embodiments, a customer may be able to set a resource usage limit. The customer computer system may be able to set resource usage limits through a user interface or through a command line prompt. For example, a customer may be able to limit or cap: total cost, number of on-demand instances, number of bid-priced instances, number of reserved instances, GBs, cost per instance type (on-demand, bid-priced, reserved), GBs used, inputs and outputs, throughput, bandwidth (e.g., megabits per second) or any other relevant metric per billing cycle. As the billing cycle progresses, the management action module 103 may analyze collected computing metrics to determine if access to additional resources need to be restricted. For example, a customer may wish to purchase no more than three on-demand instances per billing cycle. As the billing cycle progresses, the customer may purchase three on-demand instances. Once the management action module 103 discovers the customer has used three on-demand instances (through the use of the metrics collected and stored by the metrics collection module), the management action module 103 may send a command to the resource provider computer system to prevent the customer from using any more on-demand instances during the billing cycle. When the customer attempts to instantiate a fourth instance, the resource provider will reject the request.

In some embodiments, the management action module 103 allows a customer to define management actions at different operational levels. The management action module 103 may generate a user interface that allows a customer to define the management actions at different operational levels. In other embodiments, management actions may be set through a command line interface client that connects to the management action module 103 and allows customers to define management actions through commands or scripts. Examples of different operational levels may include management actions at the customer level, the user level and a resource group level. At the customer level, resource usage limits may be applied to usage types across all of the customer's resources. For example, the customer may wish to prevent additional resource allocation when the cost for computing resources reaches $10,000 for a billing cycle. At the user level, resource usage limits may be applied to usage types for a user that has been granted permission by the customer to the computing resources of the customer. For example, the customer may wish to prevent a developer from allocating additional resources after the developer has incurred a resource usage cost of $5,000 per billing cycle. At the resource group level, resource usage limits may be applied to resources for which a customer supplied usage identifier or tag (e.g., by supplying the tag through an API to the resource provider). For example, the customer may wish to prevent allocating additional resources using for a tag after resources bearing the tag reach a usage cost of $5,000 per billing cycle.

In some embodiments, the management action module 103 may also generate a notification to send to a customer when one or more enhancements may be made to improve the efficiency of a resource group. For example, the management action module 103 may analyze data in the data storage to find resource groups that are similar across more than one customer. For example, more than one customer may have a resource group including a Linux® operating system executing a MySql™ database server application. The management action module 103 may also discover that 75% of customers using the Linux operating system executing a MySql database server resource group may also be executing an additional service that improves queue latency. As a result, the management action module 103 may generate a notification to the 25% of customers that are not using the additional service to inform the customers of a performance improvement opportunity.

In other embodiments, the management action module 103 may send commands to the resource provider computer system to load balance a customer's tasks toward a resource group that provides the best possible rate of return for the customer's business metrics. The management action module 103 may provide an API that allows customers to associate business metrics with tasks it is processing using the resource provider, or associate business metrics two resource groups processing similar tasks. As the tasks are processed, the management action module 103 may determine the rate of return for each resource group, then command the resource provider to allocate more resources toward the resource group that offers the best rate of return. For example, a customer may be providing a real-time gaming application and may utilize a combination of reserved instances and on-demand instances with various infrastructure applications to serve requests for the gamming application. The customer may create resource groups by associating the reserved instances and on-demand instances through a tagging API. The customer may also provide, through the API, business metrics such as hours of game time. As the gamers use the customer's gaming application, the management action module 103 can determine which resource group results in more hours of game time and send a command to the resource provider to load balance requests handled by the gaming application toward the resource group that has the highest rate of return.

In some embodiments, the resource manager 100 may be in communication with a resource provider computer system 110. The resource provider 110 may provide resources to customer computer systems 120. In some embodiments, customers can instantiate instances from an available instance pool based on the type of instance the customer would like to use as a computing resource. For example, a customer may access reserves instances from a reserved instance pool, on-demand instances from an on-demand instance pool and/or bid-priced instances from a bid-priced instance pool. When a customer instantiates an instance, the customer may tag the instances to create a resource group. In addition, the customer may access or launch various infrastructure applications such as operating systems, servers, libraries, and/or utilities that are capable of implementing the customer's business application. For example, a customer may have an business application for executing a large scale, multi-channel marketing campaign. The customer's business application may use a resource group that includes an operating system, a database application that stores and manages leads, and one or more services applications that send out communications to leads. The elements of the resource group may also be custom applications developed by the customer, or they may be third party applications developed by third parties and offered in a market place where customers may purchase them.

In some embodiments, the resource provider 110 exposes an API so that customer computer systems 120 may instantiate, create, call or utilize resource instances, infrastructure applications, and services. The API may have methods or functions for the customer to associate a usage identifier with the resource instances infrastructure applications, and services thereby creating a resource group for management purposes. For example, if a customer has several marketing campaigns, the customer can label each one with a different usage identifier. The usage identifier may then be used by the resource manager 100 to monitor and manage the resources of each marketing campaign as separate resource groups. For example, the customer may wish to track the amount of money spent on computing resources for each marketing campaign independently from one another.

The resource provider 110 may also have an API that allows the resource manager 100 to commands it. For example, the resource provider 110 may expose and API that allows the resource manager 100 to halt the execution of an resource group when a customer has set a usage limit. The resource provider 110 may also expose an API, in some embodiments, to limit a user of the customer's usage of resources. The usage limit APIs may be called by the resource manager 100 when a usage limit defined by the customer is satisfied. For example, a customer may request a management action to prevent a user from further access to the resources the customer has purchased with the resource provider once the user exceeds $1000 in resource usage costs. When the resource manager determines that the user has reached $1000 in costs, it may make an API call to the resource provider to command the resource provider to not allow the user to access additional resources.

Examples of Interactions Between Computing Systems

Figure 2A:
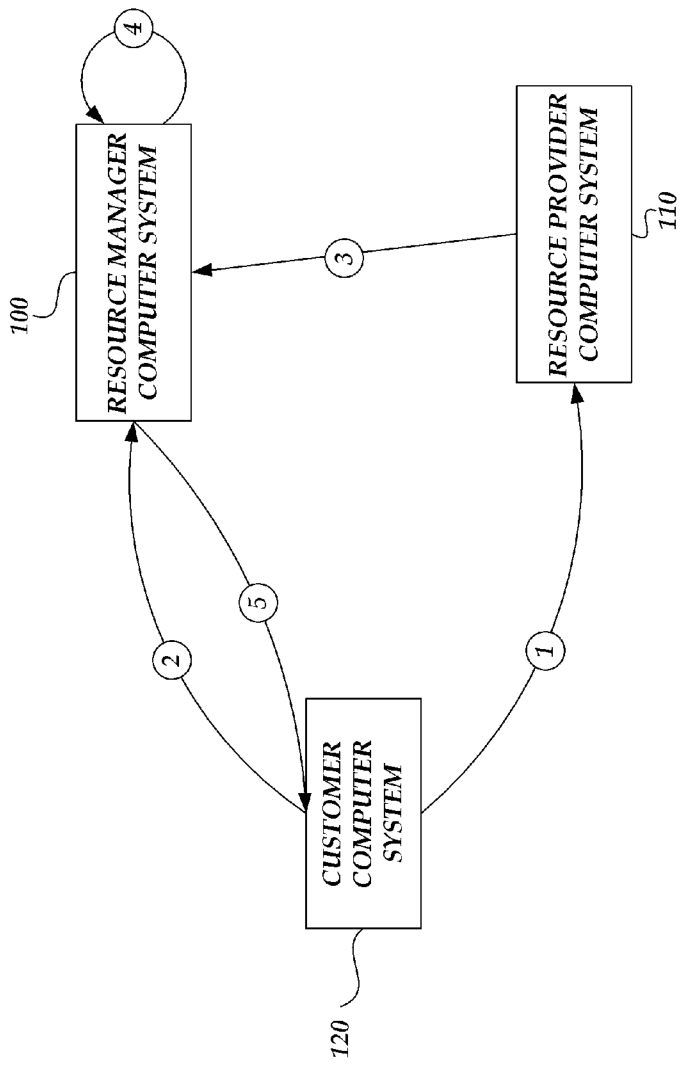
FIG. 2A depicts an illustrative interaction between the resource manager computer system, the resource provider computer system and a customer computer system when the resource manager computer system notifies the customer computer system that a user has satisfied a usage limit.

With reference now to FIGS. 2A-4B the interaction between various computing systems of FIG. 1 will be illustrated. For purposes of the example, however, the illustration has been simplified such that many of the components utilized to facilitate communications are not shown. For example, FIGS. 2A-4B do not illustrate the modules of each computing system. It can be appreciated that such components can be utilized and that additional interactions would accordingly occur without departing from the spirit and scope of the present disclosure. In addition, in some embodiments, some steps shown in FIGS. 2A-4B may be performed as the same time or in a different order, or other intervening steps may occur, without departing from the spirit and scope of the present disclosure FIG. 2A depicts an illustrative interaction between the resource manager computer system 100, the resource provider computer system 110 and a customer computer system 120 when the resource manager computer system notifies the customer computer system that a user has satisfied a usage limit. At (1) the customer computer system may register with the resource provider. Registration of the customer computer system may include creating a customer account with the resource provider. After the customer registers, he or she may instantiate one or more instances or interact with other services through the use of API calls. For example, the resource provider may provide one or more functions for initializing a reserved instance, accessing data in a storage service, accessing data in a database service, etc.

At (2), the customer computer system 120 may send a request to the resource manager computer system 100 to monitor the customer's resources. In some embodiments, the request may include a resource usage limit. For example, the customer may request a resource usage limit of "5 GB of storage." A resource usage limit may also be a cost associated with a the use of resources. For example, a customer may set a resource usage limit of "$500" for on-demand instances. Resource usage limits and resource usage limit types may also apply to resource groups or individual resources. For example, a customer may set a resource usage limit 500,000 queries handled by a database in the customer's resource group.

In some embodiments, the request may also include a usage identifier identifying the resource group for which the request applies. The usage identifier, or "tag," may correspond to a group of one or more resources that are used together to implement a business application of the customer (e.g., photo sharing application, web-store, distributing gaming application) or perform one or more processing tasks for the customer. The usage identifiers may also be used to denote the cost center of subgroup of the customer for which the cost of processing may be attributed. For example, an online e-commerce aggregator may be one customer of the resource provider, but may have one or more customers of its own. As a result, the online e-commerce aggregator may wish to tag, or identify, the resources that are being used by each of its customers. In some embodiments, the usage identifier may represent a user of the customer computer system. For example, the user may be a developer that works for the customer, or it may be a third-party customer of the customer. In some embodiments, the usage identifier is flexible and may be programmatically set by the customer through an API provided by the resource provider.

In some embodiments, at (3), the resource manager 100 retrieves usage data for customers that have requested resource monitoring. The resource manager 100 may request the usage data through an API call that the resource provider 110 exposes. In some embodiments, the resource provider computer system 110 may upload or "put" the usage data to a data store accessible by the resource manager. For example, the resource provider may load all of its usage data on a periodic basis to a data store where the resource manager may access it for analysis. In some embodiments, the resource manager may deploy a usage meter module to the resource provider that collects data and reports it back to the resource manager in real-time.

Once the resource manager 100 has access to the usage data, at (4), it may analyze the usage data. The resource manager may analyze data on a periodic basis, or it may analyze the usage data on a real-time basis depending on the embodiment. Analysis may include, for example, determining the cost for resources used by customers, comparing the usage limits defined by customers to the customers' actual usage data. The analysis may also include attributing usage of resources to the customer's users or to the customer's usage identifiers. After the analysis as (4), the resource manager may notify the customer at (5) that a usage limit has been satisfied. The notification may be an alert, such as e-mail, user interface, SMS message, MMS message, instant message, phone call, text message or any other means of communication known in the art. The notification may also be an electronic message designed to be consumed by an application. For example, the resource manager may expose an API that accepts a callback function pointer that may be called when the usage limit is satisfied, thereby allowing the customer to create a custom notification handler.

Figure 2B:
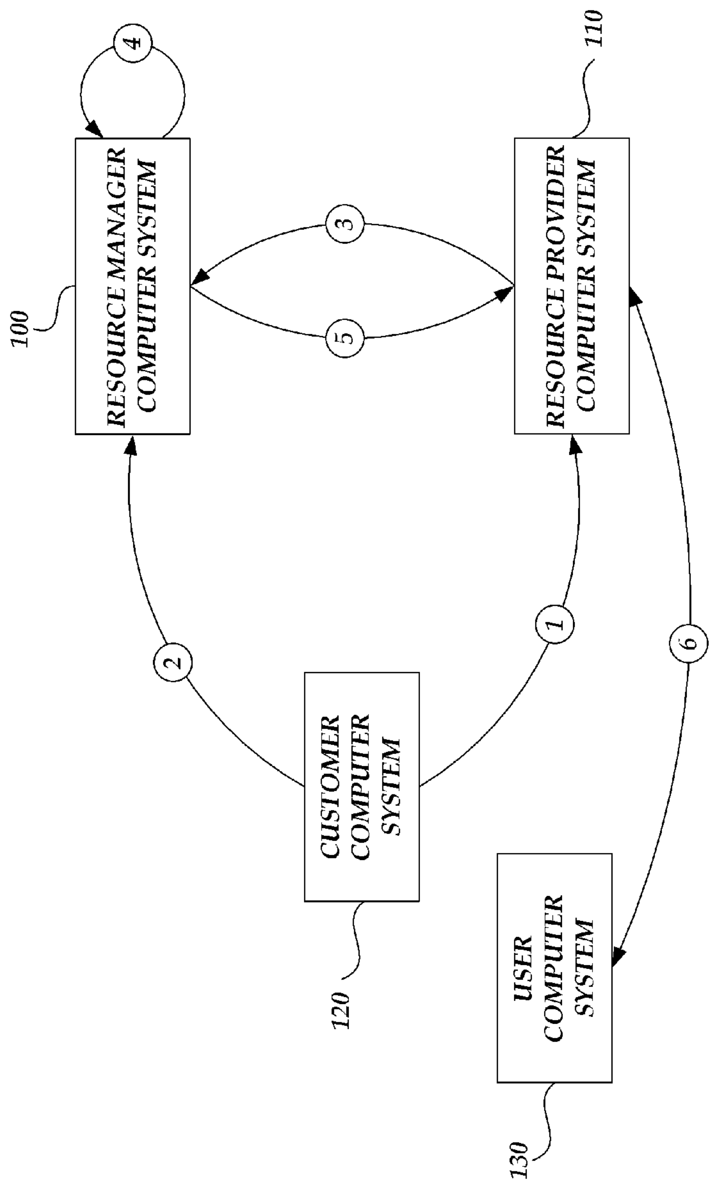
FIG. 2B depicts an illustrative interaction between the resource manager computer system, resource provider computer system and customer computer systems when the resource manager computer system prevents user access to computing resources when a user has satisfied a usage limit.

FIG. 2B depicts an illustrative interaction between the resource manager computer system 100, resource provider computer system 110 and customer computer systems 120 when the resource manager computer system prevents user access to computing resources when a user has satisfied a usage limit. Arrows (1)-(4) may perform functions that are similar to those that are described with respect to FIG. 2A. For example, the customer may (1) register and define instances and resource groups through an API, (2) send a request to the resource manager to monitor usage of its resource groups, (3) the resource manager may receive usage data from the resource provider and (4) the resource manager may analyze the usage data it receives from the resource provider.

At (5), in some embodiments, once the resource usage limit is satisfied, the resource manager 100 may send a command to the resource provider 110 commanding the resource provider to not allocate further resources to a customer 120, a user of the customer 130, or to resource group associated with a usage identifier. For example, a customer 120 may request that any resources bearing the tag "catalog_sales" not exceed 100 hours of use per billing cycle. Once the resource manager determines that resources tagged with "catalog_sales" have reached 100 hours of use, it may send a command to the resource provider to suspend execution of resource group with the "catalog_sales" tag and/or prevent additional resources from being instantiated with the "catalog_sales" tag. In some embodiments, the resource manager may send a command to the resource provider to not allow users of the customer to access additional computing resources.

As described above with respect to FIG. 1, in some embodiments, the customer 120 may create users 130 with individual security or access credentials to use the computing resources of the customer. Customers may wish to limit individual users access to the resources. For example, a customer may wish to limit resource usage of developers that are not efficiently using computing resources, or, the customer may have "sub-customers" that it allows to use the customer's resources. When a customer requests usage monitoring for a particular user, and requests that user's be preventing from accessing additional resources once the resource usage limit is met, at (5) the resource manager may command the resource provide to restrict access to the customer's resources to the identifier user once the resource usage limit is met. Then when the user attempts to access the resources at (6), the resource provider will prevent the user from accessing the customer's resources. In some embodiments, the resource provider at (6) may turn off instances, or de-provision resources, associated with the user when the user exceeds the usage limit.

It should be understood that while FIG. 2A and FIG. 2B describe different functionality, it is possible that the functionality described in FIG. 2A and FIG. 2B may be combined in one embodiment, that is, an embodiment may have both alert and resource prevention functionality. For example, a gaming site customer may have players that sign up for service with the gaming site. The gaming site customer may create a user for each player and assign separate security credentials for each player. The gaming site customer may also charge for player access in time increments, and may allow players a maximum of 30 hours of use for their accounts. The gaming site may then, for each player, request resource monitoring from the resource manager for each user (player) for no more than 30 hours of resource usage, but may also request for a notification when a player reached 25 hours. Thus, when a player reaches 25 hours, the customer will be notified, and then the player reaches 30 hours, the player will no longer be able to access the resources.

Figure 3A:
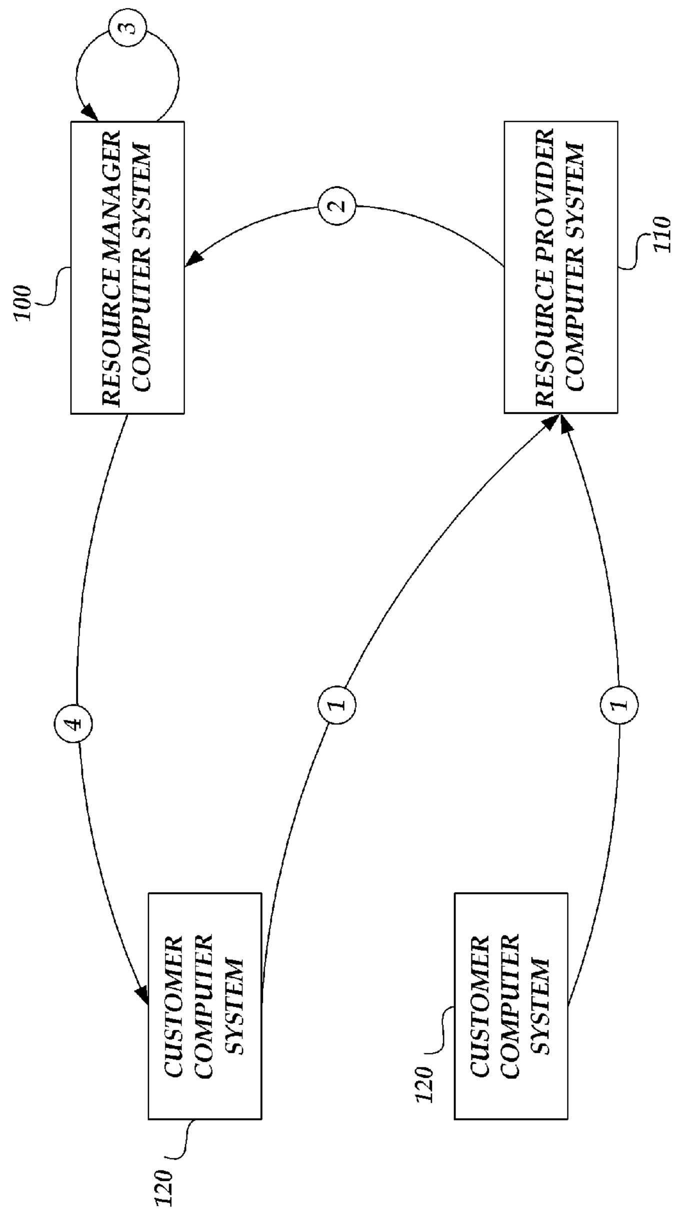
FIG. 3A depicts an illustrative interaction between the resource manager computer system, resource provider computer system and customer computer systems when the resource manager computer system notifies a customer computer system of an enhancement

FIG. 3A depicts an illustrative interaction between the resource manager computer system 100, resource provider computer system 110 and customer computer systems 120 when the resource manager computer system notifies a customer computer system of an enhancement. In some embodiments, customers may define similar resource groups. Some of the customers may use an enhancement that improves performance or reduces the costs of using the resource group. In some embodiments, customers can request to be notified when a potentially beneficial enhancement is available, and if so, may run a test task using the potentially beneficial enhancement to determine if the enhancement offers a benefit to the customer.

In one embodiment, at (1) of FIG. 3A, each customer computer system 120 registers and defines resource groups as described above. In the embodiment of FIG. 3A, both of the customers have defined similar resource groups, however, one of the customers is also using an enhancement. As each customer utilizes their resource groups, usage data is collected and reported to the resource manager (2). The usage data may include data describing the resource group of each customer. For example, the usage data may include an indication that a first customer is running two reserved-Linux-virtual-machine instances executing database servers and an on-demand instance executing a web server, while the second customer is running two reserved-Linux-virtual-machine instances executing database servers and a query optimization program and an on-demand instance executing a web server.

At (3) the resource manager may analyze the usage data to determine if there are resource groups that are substantially similar. Using the example from the preceding paragraph, the resource manager 100 may determine that the first customer and the second customer are using substantially similar resource groups. Once the resource manager determines that at least two customers are using substantially similar resource groups, but one of the customers is receiving a processing or cost benefit from an enhancement that the other customers are not utilizing, the resource manager may notify the customers not running the enhancement about the existence of the enhancement at (5). For example, the resource manager may notify the first customer that the query optimization program is available. In some embodiments, the resource manager 100 may also notify the resource provider that the customer may add the enhancement.

Figure 3B:
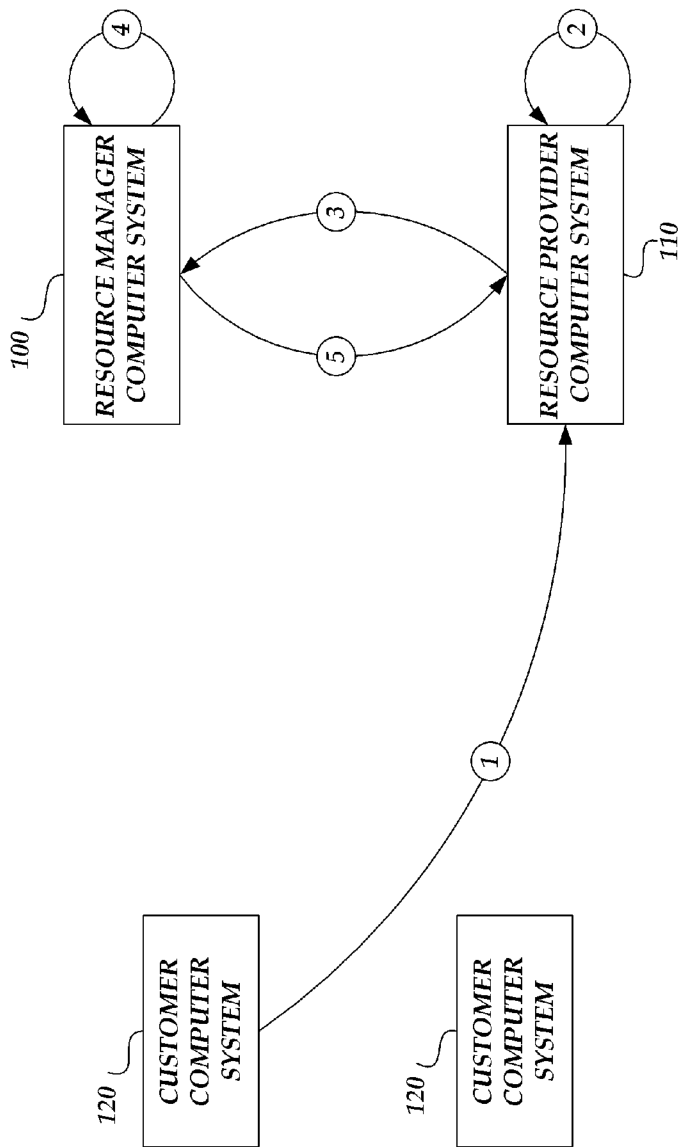
FIG. 3B depicts an illustrative interaction between the resource manager computer system, resource provider computer system and customer computer systems when the resource manager computer system automatically adds an enhancement to a resource group.

In some embodiments, once the resource manager notifies the customer of the availability of an enhancement, the customer may request that a test task be executed using the enhancement to determine if it there is a cost benefit associated with the adding the enhancement to the customer's resource group. FIG. 3B depicts an illustrative interaction between the resource manager computer system 100, resource provider computer system 110 and customer computer systems 120 when the resource manager computer system automatically adds an enhancement to a resource group. At (1), the customer computer system provides a test task to the resource provider. The test task may be, for example, a large set of data that requires processing, or may be a sample marketing campaign implemented using electronic communications such as email. The test task may also be a program that simulates Internet page request, for example.

At (2), the resource provider 110 processes the test task. In some embodiments, the resource provider will process the test task using a customer's resource group without the enhancement and also process the test task using the customer's resource group with the enhancement. Usage data for processing the test task with and without the enhancement may be collected and provided to the resource manager at (3). Once the resource manager 100 receives the usage data, it may analyze the usage data at (4) to determine if the enhancement provides a benefit to the customer for processing the test task.

In some embodiments, when the resource manager 100 determines that the enhancement provides a benefit (e.g., processing benefit or cost benefit) to the customer, the resource manager may send a command to the resource provider to include the enhancement in the customer's resource group. The resource provider 110 may expose an API with one or more function calls that allow the resource manager to specify the customer's resource group and the identity of the enhancement. In some embodiments, the resource manager computer system may notify the customer that the enhancement was beneficial, and it may be up to the customer to add the enhancement to the customer's resource group.

Figure 3C:
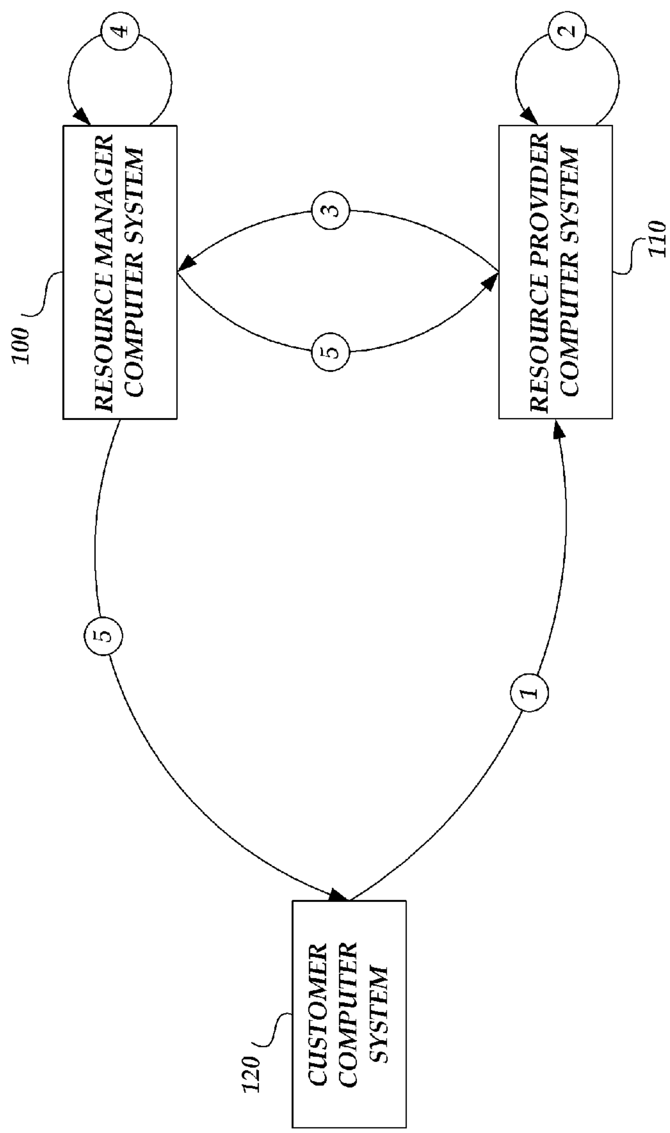
FIG. 3C depicts an illustrative interaction between the resource manager computer system, resource provider computer system and a customer computer system when the resource manager computer system tests a potential enhancement to a resource group.

In some embodiments, customers may perform "what-if" scenarios or run tests on potential enhancements to determine if the enhancement provides a benefit (e.g., processing benefit or cost benefit). FIG. 3C depicts an illustrative interaction between the resource manager computer system, resource provider computer system and a customer computer system when the resource manager computer system tests a potential enhancement to a resource group. At (1), the customer 120 provides a test task and a potential enhancement to the resource provider 110. The potential enhancement could be an "add-on" that improves performance, an alternative infrastructure application (e.g., a different database server), alternative instance execution location or the like. Once the resource provider 110 receives the test task and the potential enhancement, it may process the test task with and without the enhancement at (2). Computing metrics may then be sent to the resource manager 100, at (3) where they are analyzed at (4). Once analyzed, the resource manager may notify the customer of the test results. For example, the resource manager may generate a web page or an email and send it to the customer computer system showing the cost of using the resource group with and without the enhancement. In other embodiments, the customer may have specified to automatically incorporate the enhancement if it provides a benefit. In such embodiments, the resource manager at (5) may command the resource provider to incorporate the enhancement.

Figure 4A:
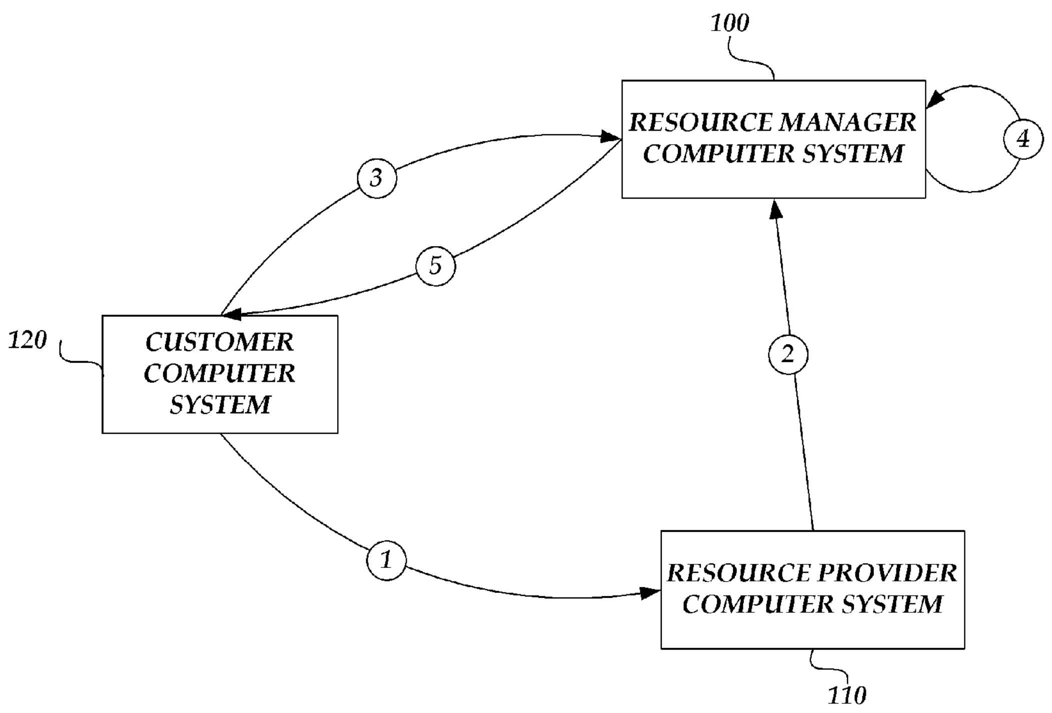
FIG. 4A depicts an illustrative interaction between the resource manager computer system, resource provider computer system and customer computer systems when the resource manager computer system reports a rate of return for computing resources to a customer computer system.

Some embodiments of the resource manager computer system 100 allow a customer 120 to upload or provide customer business metrics to the resource manager that may be used to determine a rate of return for using the computing resources provided by the resource provider. FIG. 4A depicts an illustrative interaction between the resource manager computer system 100, resource provider computer system 110 and customer computer systems 120 when the resource manager computer system reports a rate of return for computing resources to a customer computer system. At (1), the customer defines its resource groups. As the resource groups execute, the resource provider 110 may provide computing metrics to the resource manager computer system.

At (3), the resource manager 100 may receive business metrics. In some embodiments, the business metrics are collected and provided to the resource manager through the use of a client side agent that is deployed to the customer computer system or within the resource group of the resource provider. In some embodiments, the customer computer system may provide the business metrics through an API call exposed by the resource manager 100. In some embodiments, the customer 120 may provide the business metrics through the use of a user interface or "put" command line operation. Once the resource manager receives the business metrics and the computing metrics, it may analyze the metrics at (4). The analysis may include linking business metrics with their corresponding computing metrics. The resource manager 100 may link the business metrics to the computing metrics through the use of tags or labels, or through the use of API calls that identify the resource instances and/or resource groups of the customer that are associated with the business metrics.

In some embodiments, the rate of return may be calculated in a ratio of computing metric to business metric. For example, the rate of return may be calculated as "resource group cost/sales." A customer 120 may use the resource provider 110 to provide computing resources in support of a virtual market place. The customer may wish to track the average cost of resources per transaction. The resource manager 100 may receive business metrics indicating the number of transactions for a time period, and it may also determine the cost of providing resources during the time period. By dividing the number of transactions by the cost of providing resources, the resource manager may determine a rate of return.

Once the resource manager determines the rate of return, it may provide the value to the customer computer system 120 at (5). In some embodiments, the resource manager 100 may calculate rates of return for a periodic basis and provide a report to the customer showing trends in rates of return for several periods. For example, the resource manager may calculate rates of return per month, and then generate a report to provide to the customer showing a rate of return over the course of a year. The report may be generated and displayed in a user interface for example, or may be sent in a data stream or as a data object that the customer may use to render its own report. In some embodiments, the resource manager may provide the rate of return (or rate of return reports) in an email, or it may print a paper copy of the report and mail it to an address associated with the customer computer system.

Figure 4B:
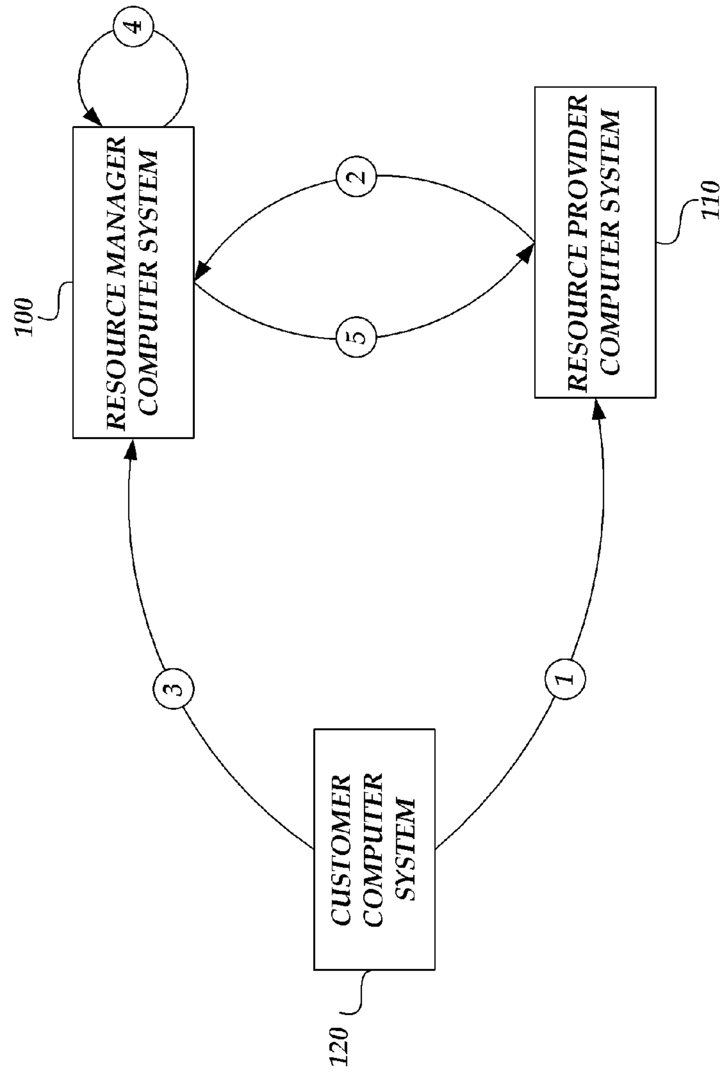
FIG. 4B depicts an illustrative interaction between the resource manager computer system, resource provider computer system and customer computer systems when the resource manager computer system directs additional resources to a resource group of a customer that has a greater rate of return.

By calculating rates of return, the resource manager provides a benefit of allowing customers to try more than one resource group for executing a business application or completing one or more computing tasks and then shift processing toward the resource group that is providing a greater rate of return. FIG. 4B depicts an illustrative interaction between the resource manager computer system 100, resource provider computer system 110 and customer computer systems 120 when the resource manager computer system directs additional resources to a resource group of a customer that has a greater rate of return. At (1), the customer may define multiple resource groups. As the resource groups execute, the resource provider 110 provides computing metrics to the resource manager at (2). At (3), the customer provides business metrics that are associated with its resource groups to the resource manager defined. Once the resource manager analyses the business metrics and the computing metrics, it may determine the rates of return (4).

In some embodiments, the resource manager 100 may have the ability to command the resource provider 110 to direct processing toward the resource group that is generating the higher rate of return. The resource provider 110 may expose an API that allows the resource manager 100 to command the resource provider 110 to direct processing toward the resource group that is providing a greater rate of return, or turn off those instances that are not generating as high of a rate of return. For example, a customer may be using the resource provider for a marketing campaign and may track the number of clients it attracts using the resource provider's resources. The customer may wish to execute two different resource groups: one using an open source database and another using a proprietary database. As the marketing campaign progresses, the customer may add additional on-demand instances executing either database to handle increased response from leads generated from the marketing campaign. The customer may request that the resource manager calculate a rate of return (e.g., cost per lead) for the open source database application resource group and the proprietary database resource group. When additional on-demand instances are required to handle the requests, the resource manager may instruct the resource provider to use the resource group with the best rate of return. For example, when the open source database resource group provides a higher rate of return, the resource manager may instruct the resource provider to allocate additional on-demand instances executing the open source database as opposed to the proprietary database. In some embodiments, the resource manager 100 may direct processing toward the resource group with the higher rate of return gradually or the resource manager may direct all processing toward the resource group with a higher rate of return in one instant. In some embodiments, the customer may request that only a certain portion of processing go to the resource group with the higher rate of return. For example, if the customer may have two resource groups handing page requests and would like to have both resource groups actively handling requests regardless of each resource group's respective rate of return. The customer may request that at minimum, each resource group handles 25% of the requests. Accordingly, the resource manager may only direct up to 75% of processing toward the resource group with the greater rate of return.

Examples of Process Flow

FIGS. 5A-7B illustrate examples of processes implemented by the resource manager computer system 100. Depending on the embodiment, the processes and methods of FIGS. 5A-7B may include fewer or additional blocks and/or the blocks may be performed in a different order than is illustrated. For ease of explanation, the processes and methods will be described herein as performed by one or more specific computer systems. However, other computer systems or modules may perform the process and methods without changing the overall scope of functionality of certain embodiments. Computer executable instructions, such as software code, configured for execution on a computing device in order to perform the methods may be provided on a tangible, non-transitory computer readable medium, such as a compact disc, digital video disc, flash drive, hard drive, memory device or any other tangible medium. Such software code may be stored, partially or fully, on a memory of a computing device, such as the resource manager computer system 100, and/or other computing devices illustrated in the figures described herein to perform the respective methods.

Figure 5A:
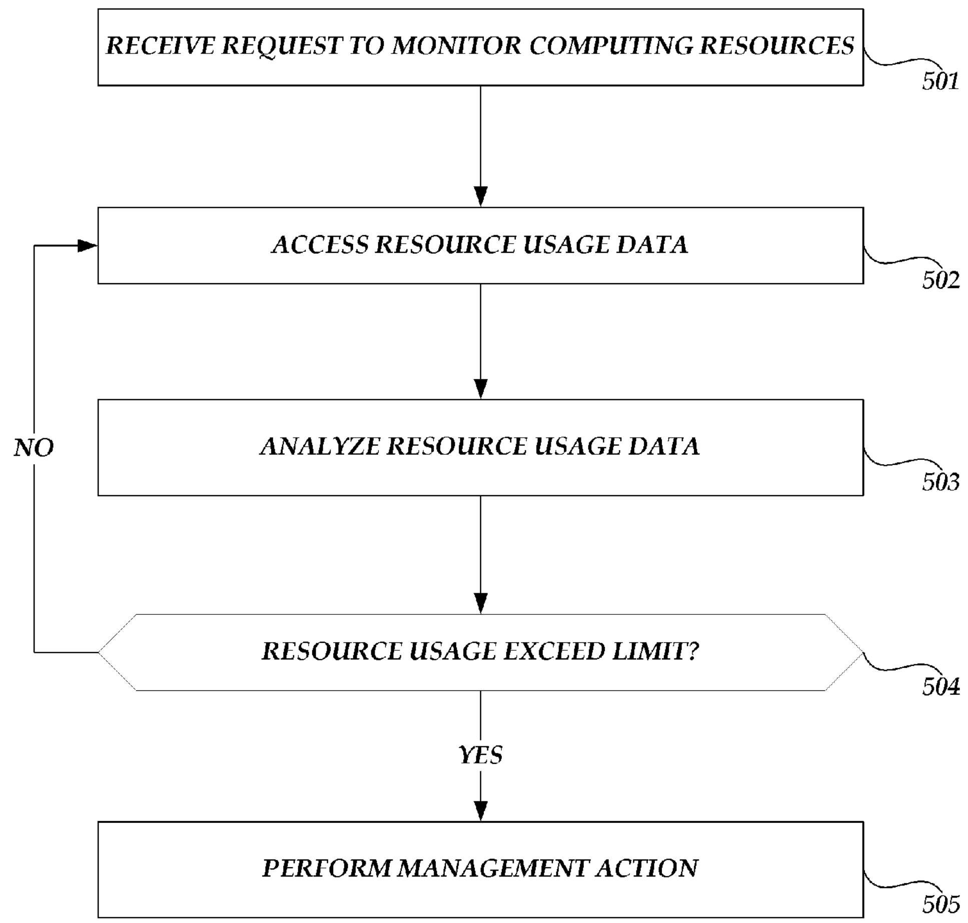
FIG. 5A is a flowchart depicting an illustrative process for performing a management action based on resource usage data.

FIG. 5A is a flowchart depicting an illustrative process for performing a management action based on resource usage data. At box 501 the resource manager 100 may receive a request to monitor computing resources from a customer computer system. In some embodiments, the management action module 103 of the resource manager may receive the request and handle initializing it. Once the request to monitor resources has been received, the metrics collection module 102 of the resource manager may access resource usage data. The resource usage data may be accessed from the data store 104, or the resource usage data may be accessed from a remote computer system such as the resource provider computer system 110. At box 503, the management action module may analyze the accessed usage data as well as the received request to determine, at box 504, if the customer has exceeded the resource usage limit. The analysis at box 503 may include determining the usage data for a resource group tagged with a usage identifier or user of the customer. In some embodiments, when the management action module 103 analyzes the usage data with respect to a cost or price usage limit, it may utilize the pricing module 101 to determine the cost of resources in the resource group. At box 504, if the resource usage limit is not met or exceeded, processing returns to box 502. If the resource usage limit is exceeded processing moves to box 505, where the management action module 103 performs a management action.

Figure 5B:
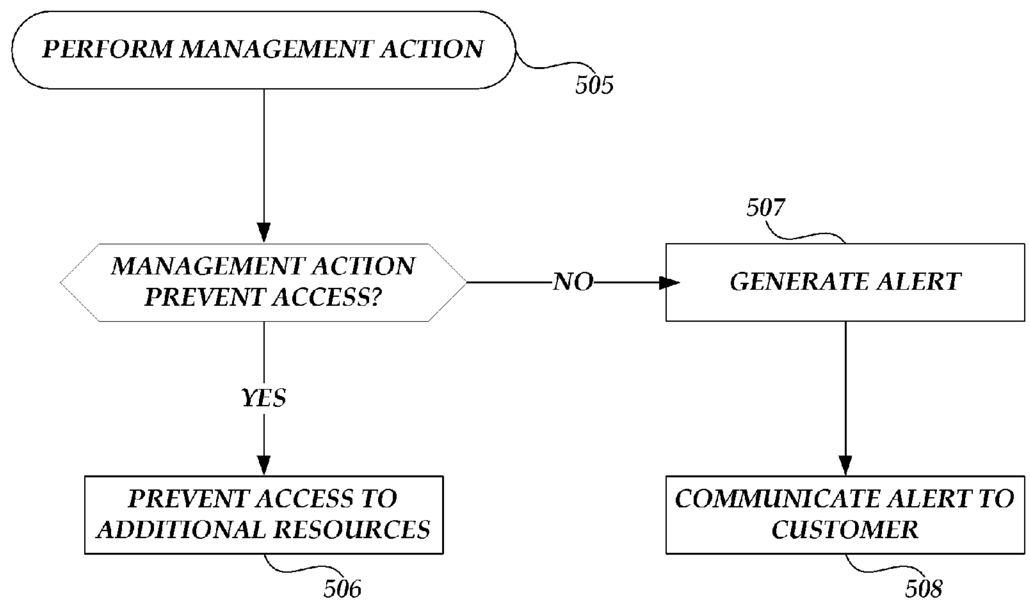
FIG. 5B is a flowchart depicting an illustrative process for determining the type of management action to perform.

FIG. 5B is a flowchart depicting an illustrative process for determining the type of management action to perform. If the management action is to prevent access to resources (e.g., for a user or for an associated resource group), processing moves to box 506. At box 506, the management action module 103 may make a remote function call to the resource provider, via an API, to prevent the customer from using resources in the resource group. In some embodiments, the management action module 103 may command the resource provider not to allow access to the customer's resources until the customer overrides the request. In other embodiments, the restriction on resources may be for a period, such as the current billing cycle.

If, however, the management action is not to prevent access, then processing moves to box 507. At box 507, the management action module 103 generates an alert. The alert may be an electronic communication that may be sent to another computing system. It may, for example, be an email. Once the alert is generated, processing moves to box 508 where the alert is communicated to the customer that requested resource monitoring.

Figure 6A:
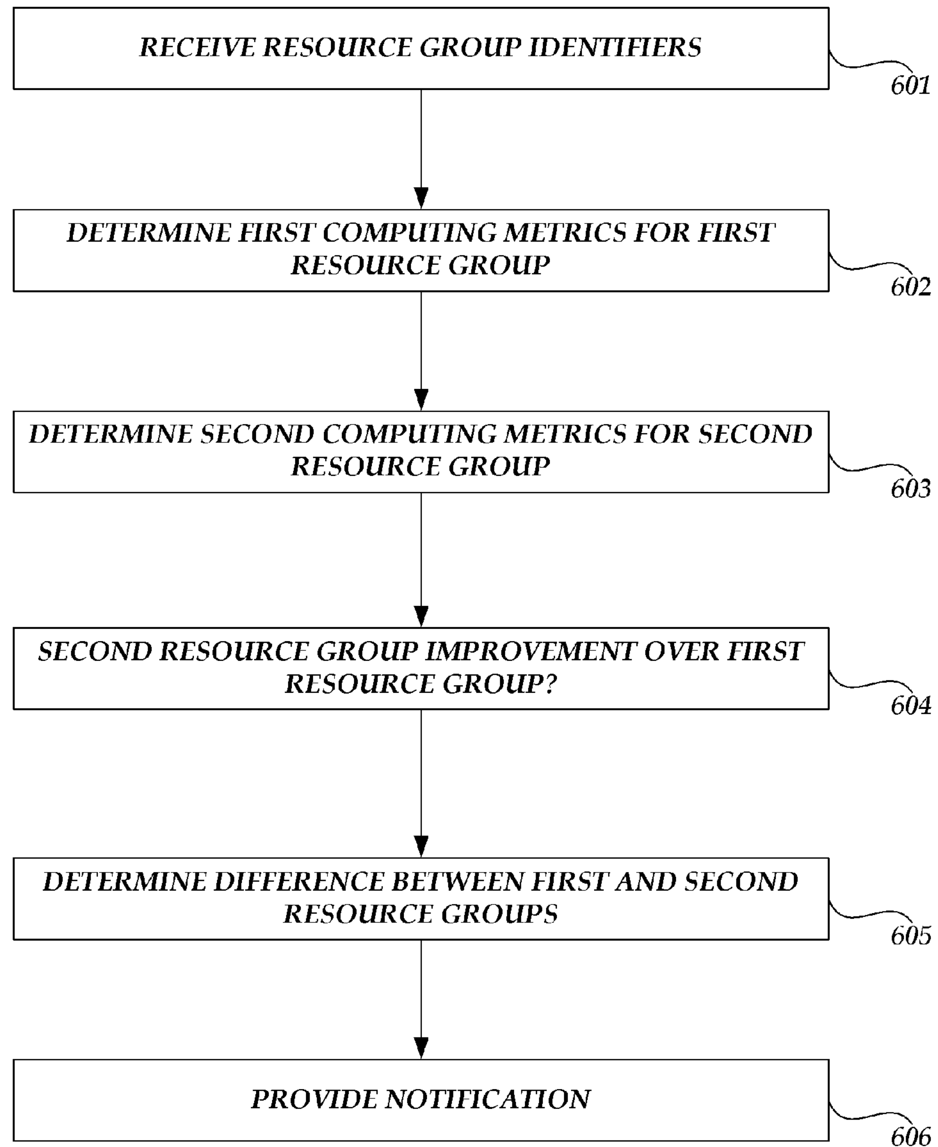
FIG. 6A is a flowchart depicting an illustrative process for providing a notification for an enhancement.

FIG. 6A is a flowchart depicting an illustrative process for providing a notification for an enhancement. At box 601, the resource provider 110 may receive resource group identification information identifying the resource groups that customer is using. The metrics collection module 102 of the resource manager 100 may then, at box 602, determine first computing metrics for a first resource group of the customer. Next, at box 603, the metrics collection module 102 may determine second computing metrics for a second resource group. If the computing metrics indicate that the second resource group is an improvement over the first resource group, the management action module 103 may determine the difference between the first resource group and the second resource group at box 605, and provide a notification, at box 606 to those customers using the resource group.

Figure 6B:
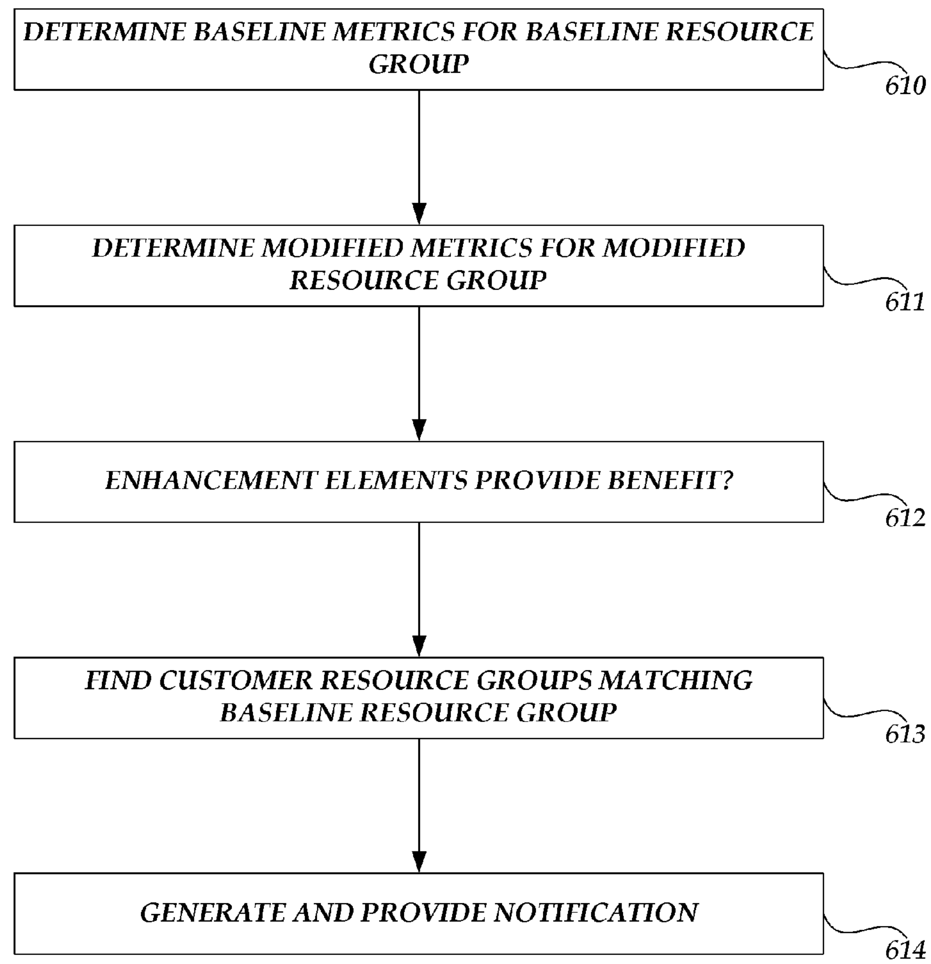
FIG. 6B is a flowchart depicting an illustrative process for providing a notification for an enhancement.

FIG. 6B is a flowchart depicting an illustrative process for providing a notification for an enhancement. At box 610 the metrics collection module 102 may determine baseline metrics for a baseline resource group. The baseline resource group may be a resource group that is used by a plurality of customers, or it may be a common resource group that is offered as bundle (e.g., an instance executing an OS, one more infrastructure applications, and/or services). The metrics collection module 102 may also determine modified metrics for a modified resource group. A modified resource group may be the same as the baseline resource group with one or more additional infrastructure applications or services. The modified resource group may also be the same as the baseline resource group but one or more instances, infrastructure applications and/or services may differ. For example, a baseline resource group may include a Linux® OS with an Apache web server and MySql database, and a modified application may include a Linux virtual OS with an Apache™ web server, MySql™ database and PHP™ (an enhancement to the baseline resource group) or a modified resource group may include a Linux® virtual OS with an Apache™ web server and PostgreSQL™ database (a substitution to the baseline resource group).

Once the metrics collection module 102 determines the baseline metrics and the modified metrics, the management action module 103 may analyze the metrics to determine if any enhancements or modifications to the baseline resource group will provide a performance or cost benefit to customers. If so, then processing moves to block 613 where the management action module 103 finds customers using the baseline resource group, but without the enhancements or modifications of the modified resource group. The management action module may generate and provide a notification to those customers. The notification may include the identity of the enhancement or modification.

In some embodiments, the process of FIG. 6B may be performed automatically and periodically by the resource manager computer system 100 without initiation by one or more customers. For example, the resource manager may execute simulated tasks against available pre-packaged resource groups. When a third party develops an enhancement for a pre-packaged resource group, it may notify the resource manager that the enhancement was designed for use the pre-packaged resource group. The resource manager may then execute the process of FIG. 6B and notify customers of the new enhancement that has become available for the resource group. Customers may then wish to test the enhancement using their own data and may, in some embodiments, request that the enhancement be added to their resource groups if it improves the performance, cost, or both of their resource groups.

Figure 6C:
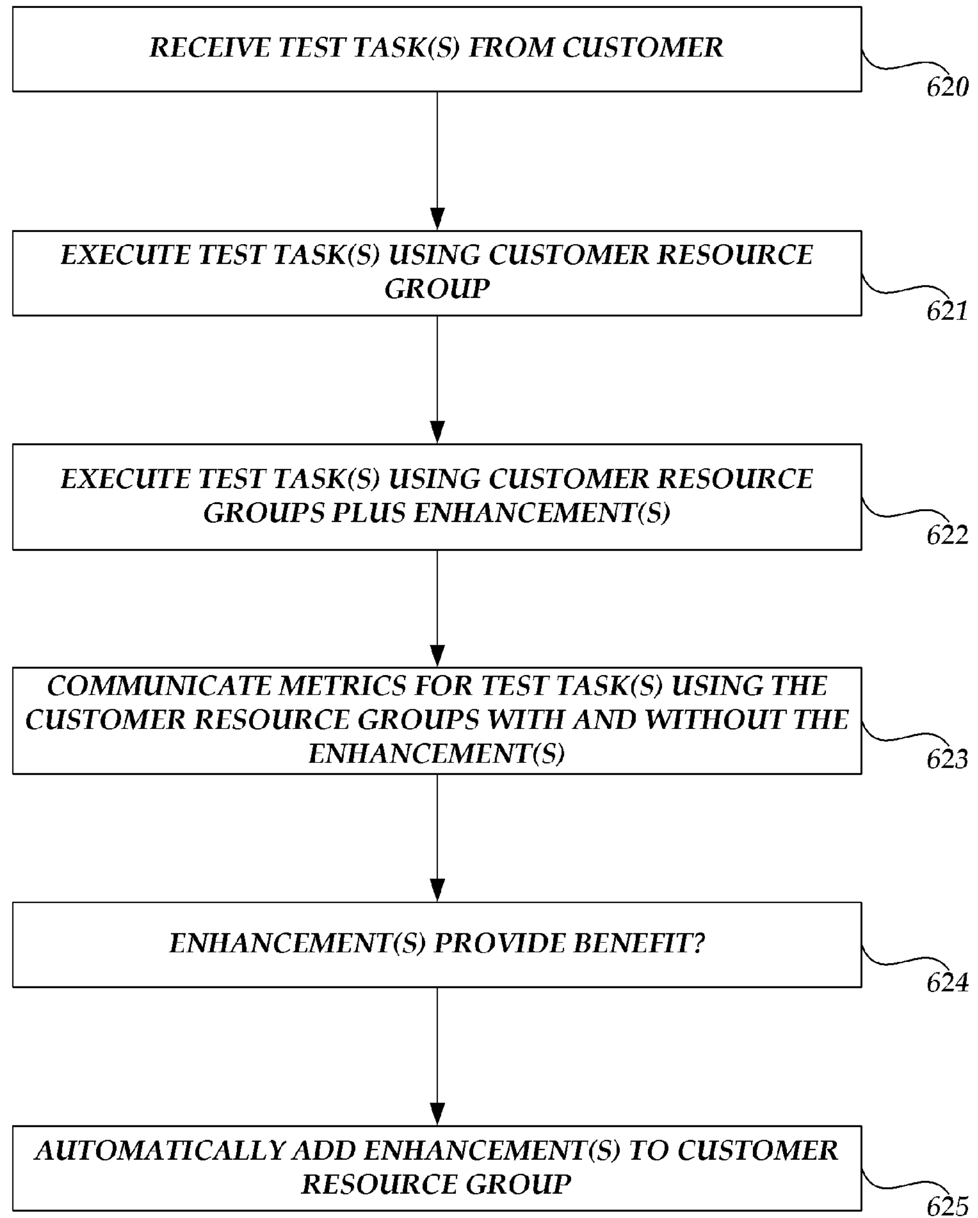
FIG. 6C is a flowchart depicting an illustrative process for automatically adding enhancements to a resource group.

FIG. 6C is a flowchart depicting an illustrative process for automatically adding enhancements to a resource group. At box 620, the resource provider 110 or, in some embodiments, the resource manager 100, receives a test task from the customer. The test task may be processed using the customer's resource group. The test task, at box 622, may then be processed using the customer's resource group plus one or more enhancements. In some embodiments, the enhancements may be the enhancements or modifications identified in FIG. 6B. If the enhancement provides a benefit it may then be automatically added to the customer's resource group at box 625.

Figure 7A:
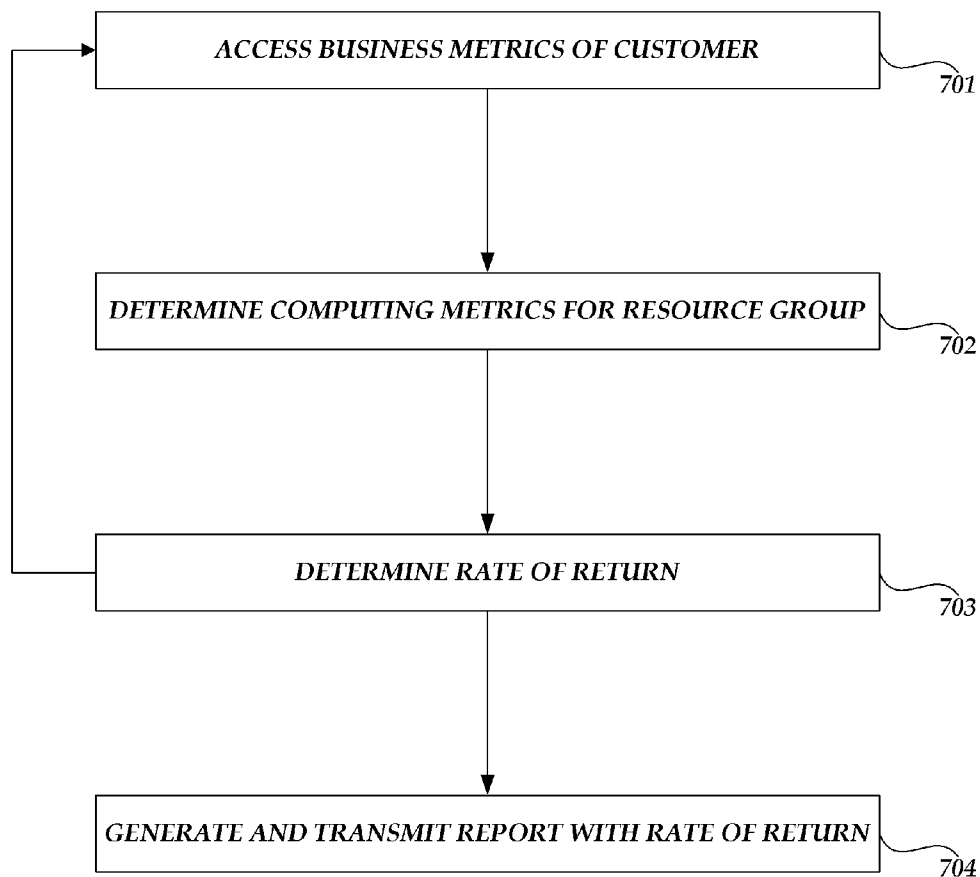
FIG. 7A is a depicting an illustrative process for generating and transmitting a rate of return associated with a resource group.

FIG. 7A depicts an illustrative process for generating and transmitting a rate of return associated with a resource group. At box 701 and 702, the metrics collection module 102 access business metrics of the customer and it determines computing metrics for a resource group. Based on the accessed metrics, the management action module may calculate a rate of return at box 703. In some embodiments, the rate of return may be included in a report that is generated and transmitted to the customer that provided the business metrics.

In some embodiments, the business metrics may not be accessed from the customer, but rather, may be accessed from the resource provider 110. The business metrics may be metrics that are recordable by the resource provider and may be common across all customers. For example, customers running a web site may be interested in a "page view" metric. Since page views may be calculated by the web server, which would be running in an instance of the resource provider, the metrics could be calculated automatically and without customer interaction. In some embodiments, the resource manager 100 may offer several common business metrics that could be used to calculate rates of return without the customer installing a local metrics agent, or without the customer uploading or providing business metric data.

Figure 7B:
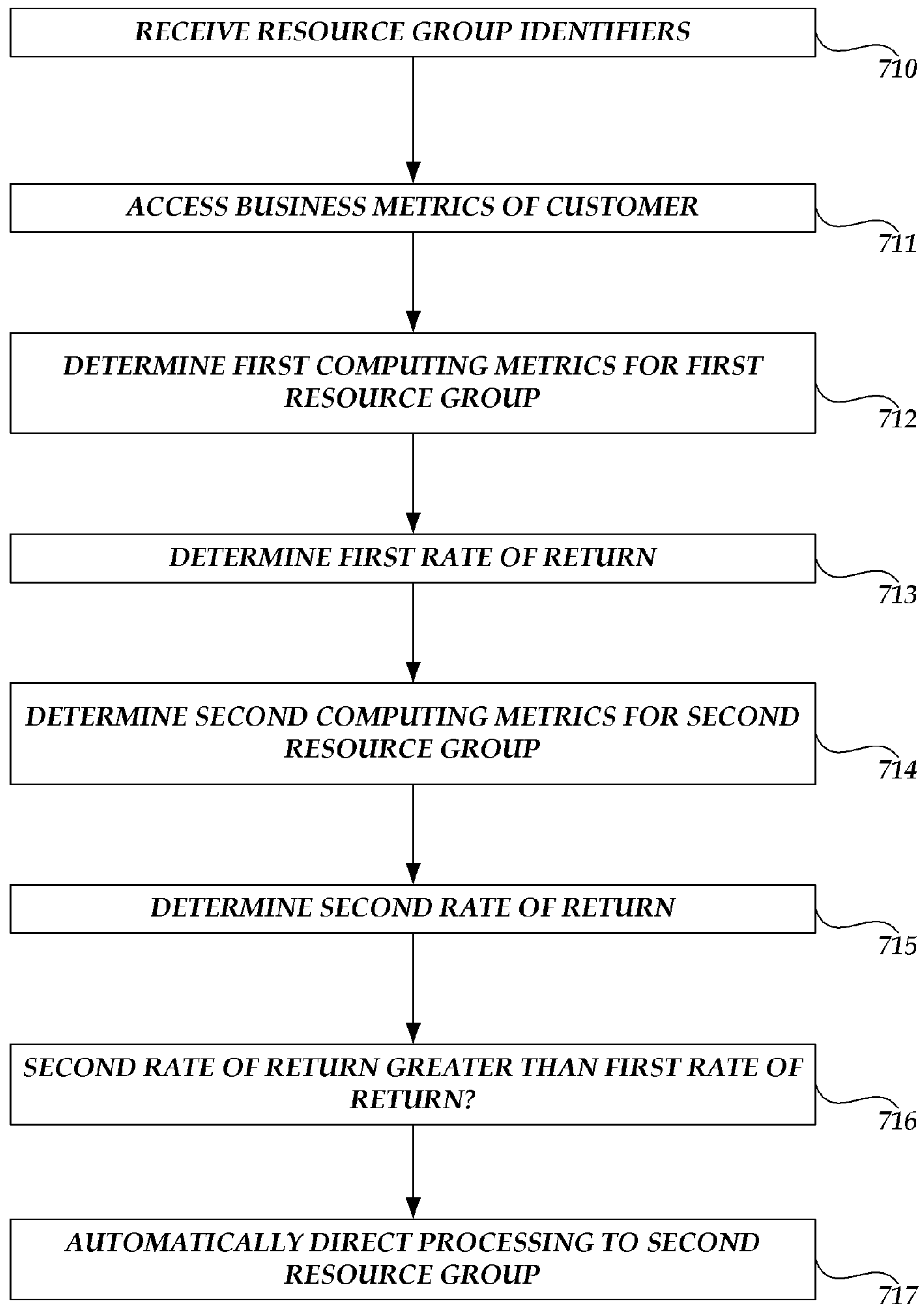
FIG. 7B is a flowchart depicting an illustrative process for automatically directing computing resources to a resource group that has the best rate of return.

FIG. 7B is a flowchart depicting an illustrative process for automatically directing processing to a resource group that has the best rate of return. At box 710, the resource manager receives resource group identifiers from the customer. The metrics collection module, at box 711, accesses or receives, business metrics of the customer that have been associated with the resource group identifiers. The metrics collection module 102 may determine first computing metrics for a first resource group. At box 714, the management action module 103 determines a first rate of return. Next, at box 712, the metrics collection module may determine second computing metrics for a second resource group. At box 715, the management action module 103 determines a second rate of return. If the second rate of return provides a greater benefit to the customer (e.g., faster performance, lower cost, greater quantity of output), the management action module commands the resource provider to direct processing toward the second resource group.

All of the processes described herein may be embodied in, and fully automated via, software code modules executed by one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase 'at least one of X, Y and Z,' unless specifically stated otherwise, is to be understood with the context as used in general to convey that an item, term, etc. may be either X, Y or Z, or some combination thereof. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code, which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method of managing computing resources, the method comprising:
- as implemented by one or more computing devices configured with specific executable instructions,
  - accessing information that describes a first resource used by a business application, the first resource operated by a resource provider;
  - determining first usage metrics for the first resource, the first resource including:
    - a first instance,
    - a first infrastructure application configured to run within the first instance, and
    - a first service used by the business application;
  - accessing information that describes a second resource used by the business application, the second resource operated by the resource provider
  - determining second usage metrics for the second resource, the second resource including:
    - a second instance,
    - a second infrastructure application configured to run within the second instance, and
    - a second service used by the business application;
  - comparing the first usage metrics and the second usage metrics to determine if the second usage metrics indicate that the second resource provides an improvement over the first resource;
  - comparing a configuration of the first resource and a configuration of the second resource to determine configuration differences between at least one of the first instance and the second instance, the first infrastructure application and the second infrastructure application, or the first service and the second service;
  - based on a determination that the second usage metrics indicate an improvement over the first usage metrics, during operation of the first resource, automatically modifying a configuration of at least one of the first instance, the first infrastructure application, or the first service based, at least in part, on the corresponding configuration of the second instance, the second infrastructure application, or the second service, wherein the modified configuration of the first resource improves performance of the first resource; and
  - providing an electronic notification to a user, the notification identifying the modification of the configuration of the first resource.

2. The computer-implemented method of claim 1, wherein the improvement provided by the second resource comprises at least one of: better performance or lower cost.

3. The computer-implemented method of claim 1, wherein the electronic communication is communicated via at least one of: email, user interface, SMS message, MMS message, instant message, text message or electronic message.

4. A system for managing computing resources, the system comprising:
- one or more processors;
- a non-transitory computer-readable medium having computer executable instructions that when executed cause the one or more processors to:
  - determine first metrics for performing a task using one or more first resources;
  - determine second metrics for performing the task using one or more second resources;
  - compare the first metrics to the second metrics to determine if the one or more second resources provides an improvement over the one or more first resources for performing the task;
  - compare a configuration of the one or more first resources and a configuration of the one or more second resources to determine a configuration difference;
  - based on a determination that the second metrics indicate an improvement over the first metrics, during operation of the one or more first resources, automatically modifying the configuration of the one or more first resources based, at least in part, on the configuration difference between the one or more first resources and the one or more second resources; and provide an electronic notification to a user, the notification identifying the modification of the configuration of the one or more first resources.

5. The system of claim 4 wherein the first metrics and the second metrics comprise indications of at least one of performance or cost.

6. The system of claim 4 wherein the configuration difference indicates one or more services used by the one or more second resources to process the task.

7. The system of claim 4 wherein the electronic notification comprises an alert and the computer executable instructions when executed further cause the one or more processors to generate an alert and communicate the alert to a customer computing system.

8. The system of claim 4 wherein the modification of the one or more first resources includes adding at least one service identified by the configuration difference to the one or more first resources.

9. The system of claim 4 wherein the modification of the one or more first resources includes using one or more instances of the one or more second resources.

10. The system of claim 4 wherein the modification of the one or more first resources includes using one or more infrastructure applications of the one or more second resources.

11. A computer-implemented method of managing computing resources, the method comprising:

as implemented by one or more computing devices configured with specific executable instructions, determining baseline metrics for processing a task using a baseline resource group the baseline resource group comprising at least one of:

one or more instances, one or more infrastructure applications configured to run within the first one or more instances, and one or more services;

determining modified metrics for processing the task using a modified resource group, the modified resource group comprising:

the baseline resource group, and one or more enhancement elements;

determine whether the modified metrics indicate that the modified resource group provides an improvement in processing the task over the baseline resource group processing the task; and based on a determination that the modified metrics indicate an improvement of the modified resource group over the baseline resource group for processing the task, during operation of the baseline resource group, automatically add the one or more enhancement elements to the baseline resource group, wherein the one or more enhancement elements modify operation of the baseline resource group.

12. The computer-implemented method of claim 11 wherein the task is a simulated task.

13. The computer-implemented method of claim 11, further comprising:

receiving a test task from a customer computing system;

executing the test task using a customer resource group;

communicating first performance metrics indicating the performance for executing the test task using the customer resource group;

executing the test task using the customer resource group and the one or more enhancement elements; and communicating second performance metrics indicating the performance for executing the test task using the customer resource group and the one or more enhancement elements.

14. The computer-implemented method of claim 13, further comprising:

receiving from the customer a request to automatically add the one or more enhancement elements to the customer resource group if the second performance metrics indicate an improvement when the one or more enhancement elements are added to the customer resource group; and automatically adding the one or more enhancement elements to the customer resource group when the resource manager computing system determines that the second performance metrics indicate an improvement when the one or more enhancement elements are added to the customer resource group.

15. The computer-implemented method of claim 14 wherein the improvement comprises at least one of: improved performance or lower cost.

16. A system for managing computing resources, the system comprising:

one or more processors;

a non-transitory computer-readable medium having computer executable instructions that when executed cause the one or more processors to:

determine baseline metrics for processing a task using a baseline resource group the baseline resource group comprising:

one or more instances, one or more infrastructure applications configured to run within the first one or more instances, and one or more services;

determine modified metrics for processing the task using a modified resource group, the modified resource group comprising:

the baseline resource group, and one or more enhancement elements;

determine whether the modified metrics indicate that the modified resource group provides an improvement in processing the task over the baseline resource group; and based on a determination that the modified metrics indicate an improvement of the modified resource group over the baseline resource group for processing the task, during operation of the baseline resource group, automatically adding the one or more enhancement elements to the baseline resource group, wherein the one or more enhancement elements modify operation of the baseline resource group.

17. The system of claim 16 wherein the task is a simulated task.

18. The system of claim 16 wherein the computer executable instructions when executed further cause the one or more processors to:

receive a test task from the customer computing system;

execute the test task using the customer resource group;

communicate first performance metrics indicating the performance for executing the test task using the customer resource group;

execute the test task using the customer resource group and the one or more enhancement elements; and, communicate second performance metrics indicating the performance for executing the test task using the customer resource group and the one or more enhancement elements.

19. The system of claim 16 wherein the improvement comprises at least one of: faster performance or lower cost.

20. A computer-readable, non-transitory storage medium comprising:

computer-executable components for analyzing data, the computer-executable components:

determining first metrics for a first resource group;

determining second metrics for a second resource group;

comparing the first metrics to the second metrics to determine if the second resource group provides an improvement over the first resource group, comparing a configuration of the first resource group to a configuration of the second resource group to determine a configuration difference, and based on a determination that the second metrics indicate an improvement over the first metrics, during operation of the first resource group, automatically modifying the configuration of the first resource group based, at least in part, on the configuration difference between the first resource group and the second resource group.

21. The computer-readable, non-transitory storage medium of claim 20, wherein the first computing metrics and the second computing metrics comprises at least one of: a speed of processing a task or a cost of processing the task.

22. The computer-readable, non-transitory storage medium of claim 20, wherein the configuration difference indicates one or more elements used by the second resource group and not used by the first resource group.

23. The computer-readable, non-transitory storage medium of claim 20, wherein the computer-executable components are further configured to communicate an electronic notification to a customer computing system indicating the modification to the first resource group.

24. The computer-readable, non-transitory storage medium of claim 20, wherein a first customer has configured the first resource group and a second customer has configured the second resource group and the configuration difference describes resources utilized by the second customer that the first customer has not utilized.

25. The computer-readable, non-transitory storage medium of claim 20 wherein the modification of the configuration of the first resource includes adding at least one service from the configuration difference to the first resource group.

26. The computer-readable, non-transitory storage medium of claim 20 wherein the modification of the configuration of the first resource includes using one or more instances of the second resource group.

27. The computer-readable, non-transitory storage medium of claim 20 wherein the modification of the configuration of the first resource includes using one or more infrastructure applications of the second resource group.

* * * * *